US012450657B2

(12) United States Patent
Learner et al.

(10) Patent No.: US 12,450,657 B2
(45) Date of Patent: *Oct. 21, 2025

(54) SOFTWARE TECHNOLOGY FOR MANAGING A CONSTRUCTION PROJECT INVOLVING MULTIPLE CURRENCIES

(71) Applicant: Procore Technologies, Inc., Carpinteria, CA (US)

(72) Inventors: Eliza Learner, Brooklyn, NY (US); Gabe Paul Harms, Pinehurst, NC (US); Ryan Christopher Huber, Santa Barbara, CA (US)

(73) Assignee: Procore Technologies, Inc., Carpinteria, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/492,567

(22) Filed: Oct. 23, 2023

(65) Prior Publication Data
US 2024/0070780 A1 Feb. 29, 2024

Related U.S. Application Data

(63) Continuation of application No. 17/355,421, filed on Jun. 23, 2021, now Pat. No. 11,798,079.

(51) Int. Cl.
*G06Q 40/04* (2012.01)
*G06F 30/13* (2020.01)
*G06Q 50/08* (2012.01)

(52) U.S. Cl.
CPC ............. *G06Q 40/04* (2013.01); *G06F 30/13* (2020.01); *G06Q 50/08* (2013.01)

(58) Field of Classification Search
None
See application file for complete search history.

(56) References Cited

U.S. PATENT DOCUMENTS 7,177,834 B1 * 2/2007 Maestle ................. G06Q 40/00
705/38
2002/0095311 A1 7/2002 Donahue
(Continued)

OTHER PUBLICATIONS

Abioye, Sofiat O. et al., "Artificial Intelligence in the Construction Industry: A Review of Present Status, Opportunities and Future Challenges", Journal of Building Engineering, vol. 44, Oct. 5, 2021, 13 pages.

*Primary Examiner* — Edward Chang
*Assistant Examiner* — Liz P Nguyen
(74) *Attorney, Agent, or Firm* — Lee Sullivan Shea & Smith LLP

(57) ABSTRACT

A computing device facilitates selection of (i) a data-object currency for a data object of a construction project and (ii) an exchange rate for converting between the data-object currency and a project currency. Based on project-level currency settings and permissions information, currency options from which a given user is permitted to select a data-object currency for the data object are identified and presented for selection. After selection of the data-object currency, based on the permissions information and information about the data object, exchange rate options from which the given user is permitted to select an exchange rate for converting between the data-object currency and the project currency are identified and presented for selection. After selection of the exchange rate, cost values for line items of the data object are converted from the data-object currency to the project currency using the exchange rate and dynamically updated based on cost value modifications.

20 Claims, 13 Drawing Sheets

(56) References Cited

U.S. PATENT DOCUMENTS

2009/0018958 A1    1/2009  Aveyard et al.
2015/0095219 A1*  4/2015  Hurley ................ G06Q 20/382
                                                    705/39

* cited by examiner

SOFTWARE TECHNOLOGY FOR MANAGING A CONSTRUCTION PROJECT INVOLVING MULTIPLE CURRENCIES

CROSS-REFERENCE TO RELATED APPLICATIONS

This application claims the benefit of priority to, and is a continuation of, U.S. application Ser. No. 17/355,421, filed Jun. 23, 2021, and titled "Software Technology for Managing a Construction Project Involving Multiple Currencies," the contents of which are incorporated by reference herein in their entirety.

BACKGROUND

Managing a project from inception to completion can be a challenging endeavor. Some projects, such as construction projects, can be highly complex, involving many moving parts that must come together effectively and efficiently to ensure that the project is successful.

For example, construction projects may involve different stakeholders that may be creators or consumers (often both). For instance, a given construction project may have a client (e.g., a project owner) who is responsible for funding the project, parties employed by the project owner (e.g., architects, engineers, etc.) to facilitate planning, design, and logistics for the project, a general contractor ("GC") who is responsible for managing the overall construction project, and numerous subcontractors (e.g., vendors, suppliers, etc.) who are responsible for providing goods and/or services to the GC to complete the project. Typically, a project owner may enter into a "prime contract" with a GC that outlines a scope of the construction project and the fees that the project owner will pay to the GC. In turn, a GC may enter into subcontracts with various different subcontractors to work on various different aspects of the construction project. For example, a GC may engage a first subcontractor to handle a first aspect of the construction project (e.g., provide goods and/or services for concrete work), a second subcontractor to handle a second aspect of the construction project (e.g., provide goods and/or services for carpentry work), a third subcontractor to handle a third aspect of the construction project (e.g., provide goods and/or services for electrical work), and so on.

Further, construction projects may involve multiple phases that must be undertaken to move the project toward completion. For instance, a construction project may commence with an initial phase that may take the form of a design phase, which may involve architects designing the overall shape and layout of a construction project, such as a building. The next phase may take the form of a planning phase, which may involve engineers using the architects' designs to produce engineering drawings and plans for the construction of the project. At this stage, engineers may also design various portions of the project's infrastructure, such as HVAC, plumbing, electrical, etc., and produce plans reflecting these designs as well.

After, or perhaps in conjunction with, the planning phase, the construction project may move to a logistics phase, which may involve contractors reviewing plans created in the planning phase and one or more project managers beginning to allocate a budget and resources for the construction project, including determining what materials to purchase, scheduling delivery, and developing a plan for carrying out the actual construction of the project. Allocating the project's budget may further involve providing cost estimates for the labor, equipment, and materials, which may be used to monitor and control cost expenditures during the construction project. The next phase may take the form of a procurement phase, which may involve hiring labor (e.g., subcontractors, on-site workers, etc.) and procuring equipment and materials for the project. Finally, the project may move to a construction phase, which may involve construction professionals beginning to construct the project based on the finalized plans. The phases of a construction project may involve various checkpoints in order to ensure that the project is completed on time, is on budget, and meets various requirements (e.g., design requirements, building codes, regulations etc.) set forth for the project.

Accordingly, having an effective and efficient project management system in place is important for any organization trying to manage a complex project such as a construction project.

Overview

As described above, a construction project can be a complex endeavor that involves managing numerous aspects effectively and efficiently to ensure that the construction project is completed successfully and in a timely manner. One aspect of construction project management that can be particularly cumbersome is management of the financial operations of the construction project. Financial management of a construction project may include, as some non-limiting possibilities, managing the overall project budget, expenses, cost projections, bids, subcontracts, purchase orders, and invoices and billing related to the project. Given the large number of construction professionals, tasks, and materials, and other items that may be involved in a construction project, financial management of the construction project can become an intricate and tedious task.

In an effort to alleviate some of the challenges associated with managing a construction project, including the financial aspects of a construction project, software technology has been developed to facilitate electronic management of a construction project. For instance, Procore Technologies, Inc., who is the assignee of the present application, offers a construction management software application that includes various software tools that facilitate management of different aspects of a construction project—including software tools for creating, modifying, and/or tracking financial data objects that comprise one or more financial line items related to a construction project. Such financial data objects may take various forms, examples of which may include a "prime contract" data object that represents an agreement between a client (e.g., a "project owner") that is responsible for financing the construction project and a "contractor" (e.g., general contractor, subcontractor, specialty contractor, etc.) that is responsible for completing work related to the construction project, a "subcontract" data object that represents a commitment (e.g., an agreement) between a party of a prime contract and a third-party subcontractor (e.g., vendor, supplier, etc.) for work related to the construction project, a "purchase order" data object that represents a financial commitment that details the types, quantities, and agreed-upon prices for products and/or services, an "invoice" data object that represents an itemized financial record of a transaction for the purchase of goods and services between two parties, and a "change order" data object that represents a modification to a contract's original scope of work.

An example of one such software tool is a commitments tool that can be used to manage the statuses and values of financial data objects. The commitments tool may enable creation of a "commitment" data object, such as a subcontract data object or a purchase order data object, that comprises a schedule of values ("SOV"). In general, an SOV itemizes agreed-upon costs (e.g., labor, materials, etc.) of a construction project to show how the costs of a contract are allocated across the work of the construction project, thereby enabling a project owner and/or general contractor to easily view, track, and manage costs of the construction project at a granular level.

The construction management software application offered by Procore Technologies, Inc. includes other software tools for creating, modifying, and/or tracking other types of financial data objects related to a construction project as well, including a change orders tool, an invoice tool, and a bid tool, as some examples.

While the advent of such construction management software has helped alleviate some of the burden associated with construction project management, including the financial aspects of construction management, existing software technology still fails to address certain extant issues pertaining to financial management of a construction project. One such challenge is the ability to utilize more than one currency when creating, modifying, and/or tracking financial data objects related to a given construction project.

For example, stakeholders (e.g., project owner, general contractor, subcontractors, suppliers, vendors, etc.) of a construction project may collaborate across different geographical locations that use different currencies. For instance, a corporation may be based in a first location that uses a first currency. That corporation (e.g., project owner) may be responsible for financing a new construction project in a second location that uses a second currency. The corporation may hire a construction company (e.g., general contractor) that is based in the second location to oversee construction of the new project. In turn, the construction company may hire a subcontractor from a third location that uses a third currency to perform a given project task. Further, the subcontractor may procure materials from a vendor in a fourth location that uses a fourth currency.

When a construction project involves more than one currency, it may be necessary to include those currencies during financial management of the construction project. For instance, contracts, budgets, reports, expenditures, and other aspects of a construction project may need to take into account multiple currencies. In general, it is desirable for different stakeholders of a project to be able to manage, view, and/or otherwise present financial data (e.g., costs, expenses, etc.) in a given currency, such as a default currency of the construction project, at any given time. In this regard, when more than one currency is involved, there is a need for conversion between currencies during management of a construction project's financial operations. For example, the subcontractor in the example above may wish to submit an invoice and receive remittance in the third currency, but the corporation may wish to remit payment in the second currency and/or view the project expenses in both the second currency when monitoring cost and budget information specific to the construction project and the first currency when monitoring cost and budget information for the corporation overall. However, existing software technology for construction management, including the software tools described above, does not provide functionality that supports utilizing multiple currencies during financial management of a construction project, including selection of a project-specific currency or creation, modification, and/or tracking of financial data objects related to the construction project, which presents drawbacks in several areas of financial management.

As one example, existing software technology does not enable users affiliated with a given stakeholder (e.g., a project owner, a general contractor, etc.) to enter a project-specific currency for a construction project that is different from a default company currency associated with the given stakeholder (e.g., the default currency associated with the stakeholder's construction management software application account), which is typically set based on the location of the stakeholder. Therefore, when engaging in financial management of any construction project involving the stakeholder, users are currently required to manage the construction project in the default company currency, despite a preference or need to use a different currency necessitated by a construction project occurring in a location that uses the different currency. For instance, in the example above, the corporation may have a default company currency that matches the first currency because the corporation is headquartered in the first location that uses the first currency. Thus, the corporation is currently required to use the first currency to manage the project's finances, even if the corporation wishes to manage the project's finances in the second currency because the project is located in the second location that uses the second currency, which in turn requires conversion (e.g., manually or using a tool that is external to the construction management software) of financial information between the second currency and the first currency in order to manage project finances in the first currency.

As another example, at the time of creating or modifying a "commitment" data object (e.g., a subcontract between a general contractor and a subcontractor), existing software technology does not enable a user to enter a currency for the "commitment" data object that is different from a default project currency for the construction project (which, as explained above, by default matches a default company currency). Thus, if the commitment data object involves parties that prefer or are required (e.g., due to location) to use different currencies (e.g., the general contractor uses a second currency and the subcontractor uses a third currency), a user that prefers or is required to use a desired currency that is different from the default project currency is currently required to convert (e.g., manually or using a tool that is external to the construction management software) any SOV line items for the "commitment" data object from the desired currency to the default project currency when creating or modifying the "commitment" data object, and is then required to track all future expenditures related to the SOV line items in that default project currency rather than the user's desired currency.

As yet another example, existing software technology does not enable reporting information (e.g., budgets, invoices, costs, etc.) to be generated in a desired currency that is different from the default project currency. Thus, a user that prefers or is required to view reporting information in a desired currency that is different from the default project currency is currently required to convert the reporting information from the default project currency to the desired currency.

Other existing software tools for creating, modifying, and/or tracking financial line items related to a construction project present similar drawbacks.

Thus, while software technology for managing the financial operations of a construction project does exist, including but not limited to the financial management software tools offered by Procore Technologies, Inc., the existing software technology fails to address many of the challenges of financial management presented by the involvement of multiple currencies. As a result, managing the financial operations of a construction project that involves two or more different currencies—including, but not limited to, cost projections, contracting, invoicing, reporting, and budgeting—can become time-consuming, tedious, and costly, and may result in increased accounting discrepancies and client dissatisfaction.

To address these and other shortcomings, disclosed herein is new software technology that improves upon existing technology for financial management of a construction project involving multiple currencies. At a high level, the disclosed software technology enables customization of currency settings at one or both of a company level or a project level, and further enables defining, for each financial data object comprising one or more financial line items related to a construction project, a data object-specific currency and a data object-specific currency exchange rate that is to be used for conversions between the data object-specific currency and one or more other currencies (e.g., a project-level currency). This software technology includes various aspects.

In a first aspect, the disclosed software technology provides an interface that enables a user to define currency settings at a company level, such as a default currency for the company, a set of other available currencies that can be used in connection with construction projects involving the company, a "current" effective exchange rate for each available currency, and/or a listing of prior exchange rates for each available currency. As will be described in further detail below, this interface for defining company-level currency settings may take various forms.

In a second aspect, the disclosed software technology provides an interface that enables a user to define currency settings at a project level, such as a default currency for a given project, an exchange rate for use in converting between the project's default currency and the company's default currency, and a set of other available currencies that can be used when creating and/or modifying financial data objects for the project. As will be described in further detail below, this interface for defining project-level currency settings may take various forms.

In a third aspect, the disclosed software technology provides an interface for creating or modifying a financial data object that (i) presents a user with a set of one or more currency options that are selectable by the user in order to specify a data object-specific currency for the financial data object being created or modified and (ii) presents the user with a set of one or more exchange rate options that are selectable by the user in order to specify a data object-specific exchange rate for the financial line item being created or modified that is to be used for conversion between the data object-specific currency and a project-level currency for the construction project. In this respect, the set of one or more currency options and the set of one or more exchange rate options that are presented to the user may take various forms and may be determined in various manners.

For instance, the set of one or more currency options that is presented to the user when creating or modifying a financial data object may take various forms, examples of which may include a previously-defined project-level set of available currencies, a previously-defined company-level set of available currencies, and/or some other predefined list of available currencies (e.g., an ISO currency standard), among other possibilities. Further, in some implementations, the disclosed software technology's determination of which currency option(s) to present to the user may additionally be based on other factors, such as information about the user (e.g., profile and/or permissions information for the user) and/or information about the particular financial data object being created or modified (e.g., location information for one or more parties associated with the financial data object), among other possibilities.

Likewise, the set of one or more currency exchange rate options that is presented to the user when creating or modifying a financial data object may take various forms. As one possibility, the set of one or more currency exchange rate options may include a "current" exchange rate for converting between the data object's selected currency and the project's currency, which comprises the most-recent effective exchange rate that has been made available to the software technology at the time that the financial data object is being created or modified.

As another possibility, the set of one or more currency exchange rate options may include at least one exchange rate for converting between the data object's selected currency and the project's currency that is tied to a relevant date associated with the financial data object, which may vary depending on the type of financial data object. For example, if the financial data object comprises a "commitment" data object that represents a contract or purchase order, the set of one or more currency exchange rate options may include an exchange rate associated with the date on which the commitment was previously created (if applicable), the date on which the commitment was formally executed, or the effective date of the commitment, among other possibilities. Other examples are possible as well.

As yet another possibility, the set of one or more currency exchange rate options may include a "look-up" option that enables the user to enter a given date and then presents the user with an exchange rate for converting between the data object's selected currency and the project's currency that is associated with the given date. As still another possibility, the set of one or more currency exchange rate options may include a "custom" option that enables the user to enter some other exchange rate for converting between the data object's selected currency and the project's currency.

The set of one or more currency exchange rate options may include other types of exchange rate options as well, and the current, date-specific, and "lookup" exchange rate values that are presented to a user may be determined in various manners, including by accessing exchange rate information that has previously been imported into the software (e.g., via a company-level currency interface) and/or by obtaining exchange rate information via an Application Programming Interface (API), among other possibilities.

Further, the disclosed software technology's determination of which currency exchange rate option(s) are to be presented to a user may be based on various factors, examples of which may include information about the user (e.g., profile and/or permissions information for the user), information about the particular financial data object that is being created or modified, and/or information about one or more financial data objects related to the particular financial data object that is being created or modified (e.g., if the particular financial data object is an invoice, the currency exchange rate options may include a current exchange rate for the commitment against which an invoice is being billed.

As one possibility, the disclosed software technology's determination of which currency exchange rate option(s) are to be presented to a user that is creating or modifying a financial data object may be based on whether the user is creating a new financial data object or modifying a previously-created financial data object. In such implementations, a first set of exchange rate options may be presented to a user that is creating a new financial data object, whereas a second set of exchange rate options (different from the first set) may be presented to a user that is modifying an existing financial data object. For instance, a more limited set of options may be presented to a user that is creating a new financial data object, because certain types of exchange rate options may not be applicable to the creation of a new financial data object (e.g., an exchange rate associated with the prior creation data of the financial data object), whereas a broader set of options may be presented to a user that is modifying a previously-created financial data object. For example, if a user is creating a new financial data object, the set of one or more exchange rate options may include a current exchange rate, perhaps along with a custom option and/or date lookup option, but may not include any date-specific options. On the other hand, if a user is modifying a previously-created data object, the set of one or more currency exchange rate options may include both a current exchange rate and also an exchange rate associated with a prior creation date of the financial data object (and/or some other date relevant to financial data object), perhaps along with a custom option and/or date lookup option. Conversely, it may be possible that a broader set of options may be presented to a user that is creating a new financial data object, whereas a more limited set of options may be presented to a user that is modifying a previously-created financial data object.

As another possibility, the disclosed software technology's determination of which currency exchange rate option(s) are to be presented to a user that is creating or modifying a financial data object may be based on an evaluation of a permission level associated with the user. In such an implementation, users having a higher level of permissions (e.g., administrator-level permissions) may generally be presented with a broader set of currency exchange rate options when creating or modifying a financial data object, whereas users having a lower level of permissions (e.g., standard-level permissions) may generally be presented with a more limited set of currency exchange rate options when creating or modifying a financial data object.

For example, if a user that is creating or modifying a financial data object has a higher level of permissions such as administrator-level permissions, the disclosed software technology may determine that the user is to be presented with a broader set of exchange rate options that may include a current exchange rate for converting between the data object's selected currency and the project's currency, a custom option whereby the user may input a custom exchange rate for converting between the data object's selected currency and the project's currency, and perhaps also a date lookup option and/or a date-specific option (e.g., an exchange rate associated with a prior creation date for a commitment if applicable). On the other hand, if a user that is creating or modifying a financial data object has a lower level of permissions such as standard-level permissions, the disclosed software technology may determine that the user is to be presented with a more limited set of exchange rate options that may include as little as just a single exchange rate option—such as only the current exchange rate (if the data object is being created) or only the exchange rate associated with the prior creation date for the data object (if the data object is being modified)—or may include some other limited set of exchange rates that does not include the same universe of options that would be presented to a user having a higher level of permissions (e.g., the current exchange rate and perhaps one or more date-specific options but not a custom option or a date lookup option).

While the foregoing describes a two-tiered approach for determining the set of one or more currency exchange rate options based on user permissions, it should also be understood that a data platform could support three or more different tiers of user permissions, in which case each different tier could potentially correspond to a different set of one or more exchange rate options that is to be presented to a user or multiple different tiers of user permissions could correspond to a same set of one or more exchange rate options (e.g., a standard-level of permissions and a read-only-level of permissions could correspond to the same set of one or more exchange rate options whereas an administrator-level of permissions could correspond to a different set of one or more exchange rate options).

The disclosed software technology's determination of which currency exchange rate option(s) are to be presented to a user may be based on other factors as well.

After a given currency and exchange rate have been selected for a financial data object, the disclosed software technology may then use the financial data object's selected currency and exchange rate for various purposes. As one possibility, the disclosed software technology may use the financial data object's selected currency and exchange rate to convert the financial data object's one or more financial line items from the financial data object's selected currency to a project-level and/or company-level currency when generating financial reports related to the construction project. As another possibility, the disclosed software technology may use project-level currency settings to convert financial information related to one or more projects from a project currency to a company currency when generating, tracking, and/or viewing company financial reports. The disclosed software technology may use the financial data object's selected currency and exchange rate for other purposes as well.

Accordingly, in one aspect, disclosed herein is a computer-implemented method that involves (i) receiving, via a client station associated with a user, a request to create a financial data object for a given construction project; (ii) causing the client station to present, via a graphical user interface (GUI) displayed at the client station, a set of one or more currency options for the financial data object; (iii) receiving, from the client station, an indication that a first currency has been selected for the financial data object; (iv) based at least on a permission level of the user, determining a set of one or more exchange rate options for converting from the first currency to a second currency associated with the given construction project; (v) causing the client station to present, via the GUI displayed at the client station, the determined set of one or more exchange rate options for converting from the first currency to the second currency associated with the given construction project; and (vi) creating the financial data object, wherein the created financial data object includes data indicating (a) the first currency that has been selected for the financial data object and (b) a given one of the set of one or more exchange rate options to use for converting from the first currency to the second currency associated with the given construction project.

In another aspect, disclosed herein is a computing system that includes a network interface, at least one processor, a non-transitory computer-readable medium, and program instructions stored on the non-transitory computer-readable medium that are executable by the at least one processor such that the computing system is configured to carry out the functions disclosed herein, including but not limited to the functions of the foregoing method.

In yet another aspect, disclosed herein is a non-transitory computer-readable medium provisioned with software that is executable to cause a computing platform to carry out the functions disclosed herein, including but not limited to the functions of the foregoing method.

One of ordinary skill in the art will appreciate these as well as numerous other aspects in reading the following disclosure.

BRIEF DESCRIPTION OF THE DRAWINGS

FIGS. 6A-6D depict example views of an interface that may be used for creating or modifying a financial data object according to example embodiments of the disclosed software technology.

FIG. 7 depicts an example report according to an example embodiment of the disclosed software technology.

Figure 1:
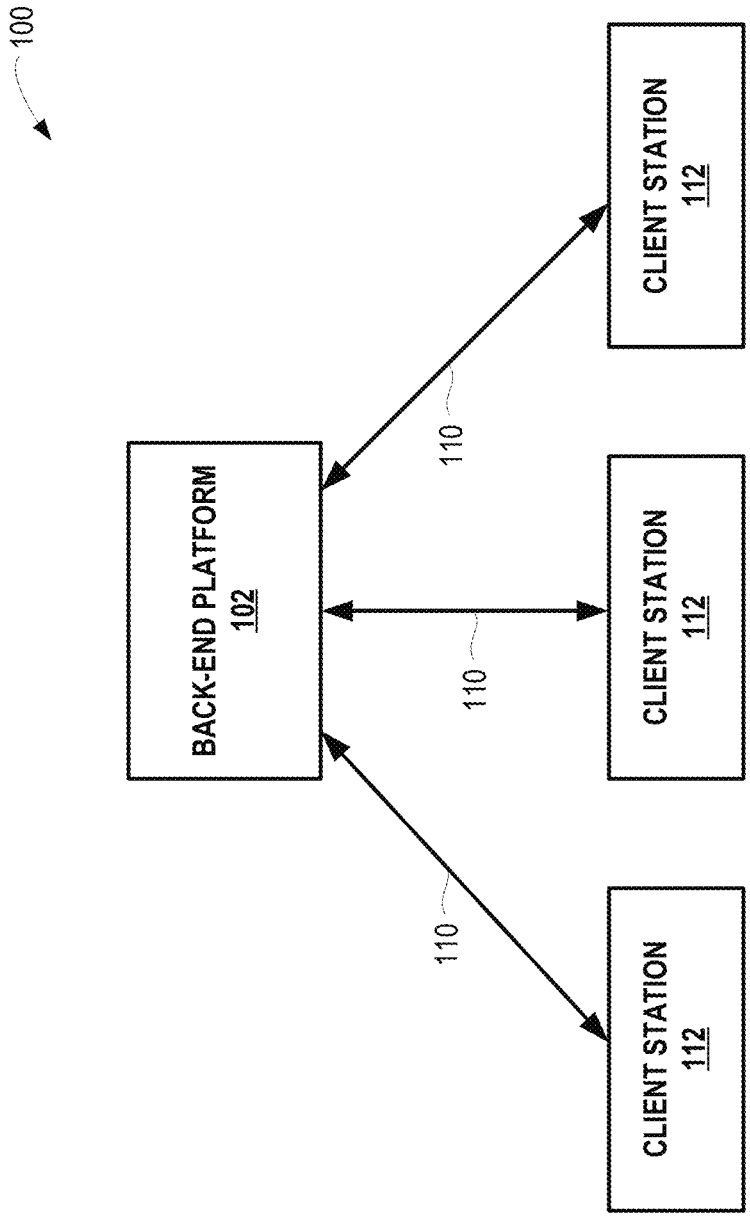
FIG. 1 depicts an example network configuration in which example embodiments may be implemented.

Features, aspects, and advantages of the presently disclosed technology may be better understood with regard to the following description, appended claims, and accompanying drawings, as listed below. The drawings are for the purpose of illustrating example embodiments, but those of ordinary skill in the art will understand that the technology disclosed herein is not limited to the arrangements and/or instrumentality shown in the drawings.

DETAILED DESCRIPTION

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

I. EXAMPLE SYSTEM CONFIGURATION

The present disclosure is generally directed to software technology for financial management of a construction project involving multiple currencies. At a high level, the disclosed software technology enables customization of currency settings at one or both of a company level or a project level, and further enables defining, for each financial data object comprising one or more financial line items related to a construction project, an (i) object-specific currency and an (ii) object-specific currency exchange rate that is to be used for conversions between the data object-specific currency and one or more other currencies. This disclosed software technology may be incorporated into a software application that may take any of various forms.

As one possible implementation, this software technology may be incorporated into a software application that includes both front-end software running on one or more client stations that are accessible to individuals associated with construction projects (e.g., contractors, subcontractors, project managers, architects, engineers, designers, etc., each of which may be referred to generally herein as a "construction professional") and back-end software running on a back-end computing platform (sometimes referred to as a "cloud" platform) that interacts with and/or drives the front-end software, and which may be operated (either directly or indirectly) by the provider of the front-end client software. As another possible implementation, this software technology may be incorporated into a software application that takes the form of front-end client software running on one or more client stations without interaction with a back-end computing platform. The software technology disclosed herein may be incorporated into software applications that take other forms as well. Further, such front-end client software may take various forms, examples of which may include a native application (e.g., a mobile application), a web application running on a client station, and/or a hybrid application, among other possibilities.

Turning now to the figures, FIG. 1 depicts an example network configuration 100 in which example embodiments of the present disclosure may be implemented. As shown in FIG. 1, network configuration 100 includes a back-end computing platform 102 that may be communicatively coupled to one or more client stations, depicted here, for the sake of discussion, as client stations 112.

Broadly speaking, back-end computing platform 102 may comprise one or more computing systems that have been provisioned with software for carrying out one or more of the functions disclosed herein, including but not limited to: providing one or more interface views that enables a user to define currency settings, specify currencies and respective exchange rates, and/or create and/or modify financial data objects related to a construction project, and/or transmit data and/or instructions that cause one or more client stations 112 to receive and/or output information related to a construction project. The one or more computing systems of back-end computing platform 102 may take various forms and be arranged in various manners.

For instance, as one possibility, back-end computing platform 102 may comprise computing infrastructure of a public, private, and/or hybrid cloud (e.g., computing and/or storage clusters) that has been provisioned with software for carrying out one or more of the functions disclosed herein. In this respect, the entity that owns and operates back-end computing platform 102 may either supply its own cloud infrastructure or may obtain the cloud infrastructure from a third-party provider of "on demand" computing resources, such as Amazon Web Services (AWS) or the like. As another possibility, back-end computing platform 102 may comprise one or more dedicated servers that have been provisioned with software for carrying out one or more of the functions disclosed herein. Other implementations of back-end computing platform 102 are possible as well.

In turn, client stations 112 may each be any computing device that is capable of running the front-end software disclosed herein. In this respect, client stations 112 may each include hardware components such as a processor, data storage, a user interface, and a network interface, among others, as well as software components that facilitate the client station's ability to run the front-end software disclosed herein (e.g., operating system software, web browser software, etc.). As representative examples, client stations 112 may each take the form of a desktop computer, a laptop, a netbook, a tablet, a smartphone, and/or a personal digital assistant (PDA), among other possibilities.

As further depicted in FIG. 1, back-end computing platform 102 may be configured to interact with client stations 112 over respective communication paths 110. In this respect, each communication path 110 between back-end computing platform 102 and one of client stations 112 may generally comprise one or more communication networks and/or communications links, which may take any of various forms. For instance, each respective communication path 110 with back-end computing platform 102 may include any one or more of point-to-point links, Personal Area Networks (PANs), Local-Area Networks (LANs), Wide-Area Networks (WANs) such as the Internet or cellular networks, cloud networks, and/or operational technology (OT) networks, among other possibilities. Further, the communication networks and/or links that make up each respective communication path 110 with back-end computing platform 102 may be wireless, wired, or some combination thereof, and may carry data according to any of various different communication protocols. Although not shown, the respective communication paths 110 between client stations 112 and back-end computing platform 102 may also include one or more intermediate systems. For example, it is possible that back-end computing platform 102 may communicate with a given client station 112 via one or more intermediary systems, such as a host server (not shown). Many other configurations are also possible.

The interaction between client stations 112 and back-end computing platform 102 may take various forms. As one possibility, client stations 112 may send certain user input related to a construction project to back-end computing platform 102, which may in turn trigger back-end computing platform 102 to take one or more actions based on the user input. As another possibility, client stations 112 may send a request to back-end computing platform 102 for certain project-related data and/or a certain front-end software module, and client stations 112 may then receive project-related data (and perhaps related instructions) from back-end computing platform 102 in response to such a request. As yet another possibility, back-end computing platform 102 may be configured to "push" certain types of project-related data to client stations 112, such as rendered three-dimensional views, in which case client stations 112 may receive project-related data (and perhaps related instructions) from back-end computing platform 102 in this manner. As still another possibility, back-end computing platform 102 may be configured to make certain types of project-related data available via an API, a service, or the like, in which case client stations 112 may receive project-related data from back-end computing platform 102 by accessing such an API or subscribing to such a service. The interaction between client stations 112 and back-end computing platform 102 may take various other forms as well.

In practice, client stations 112 may each be operated by and/or otherwise associated with a different individual that is associated with a construction project. Further, while FIG. 1 shows an arrangement in which three particular client stations are communicatively coupled to back-end platform 102, it should be understood that a given arrangement may include more or fewer client stations.

Although not shown in FIG. 1, back-end computing platform 102 may also be configured to receive data, such as data related to a construction project, from one or more external data sources, such as an external database and/or another back-end computing platform or platforms. Such data sources—and the data output by such data sources—may take various forms.

It should be understood that network configuration 100 is one example of a network configuration in which embodiments described herein may be implemented. Numerous other arrangements are possible and contemplated herein. For instance, other network configurations may include additional components not pictured and/or more or less of the pictured components.

II. EXAMPLE COMPUTING PLATFORM

Figure 2:
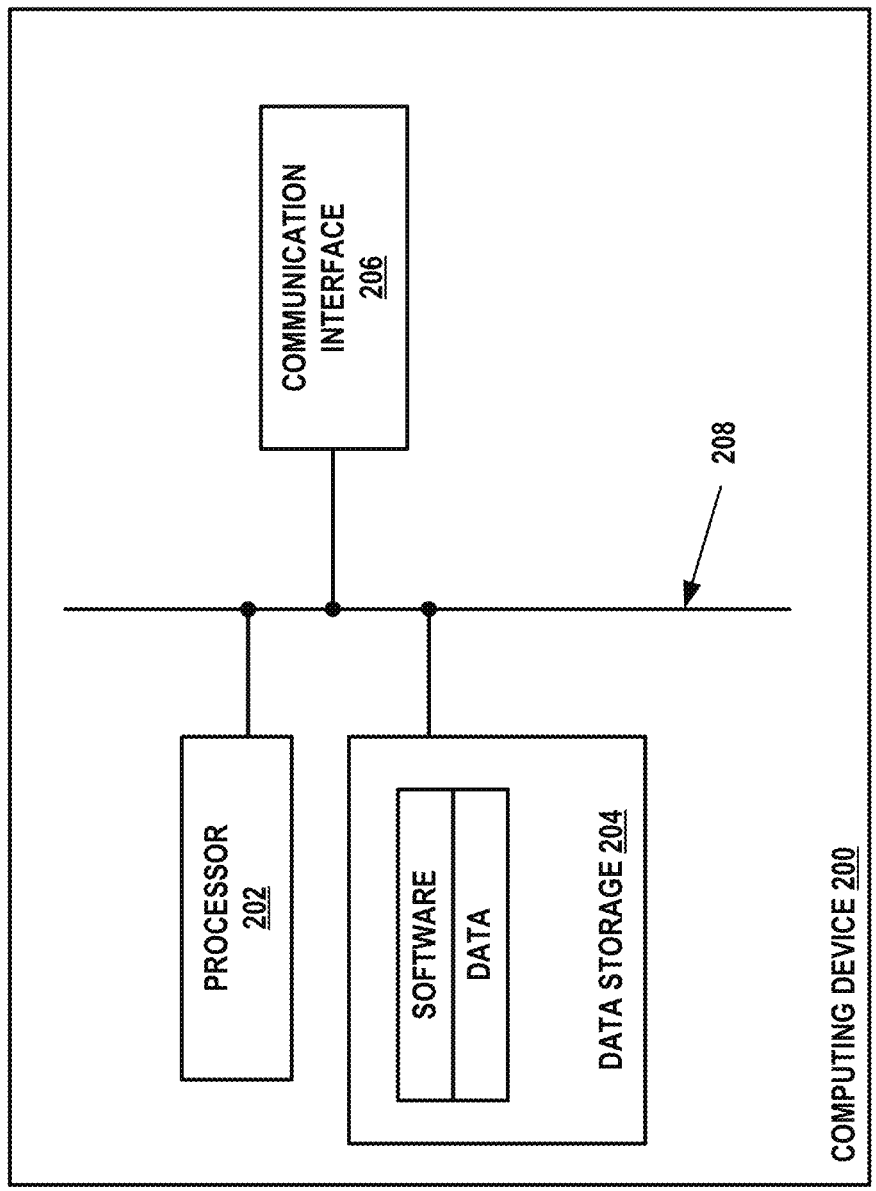
FIG. 2 depicts an example computing device that may be configured to carry out one or more of the functions of the present disclosure.

FIG. 2 is a simplified block diagram illustrating some structural components that may be included in an example computing device 200, which could serve as, for instance, the back-end computing platform 102 and/or one or more of client stations 112 in FIG. 1. In line with the discussion above, computing device 200 may generally include at least a processor 202, data storage 204, and a communication interface 206, all of which may be communicatively linked by a communication link 208 that may take the form of a system bus or some other connection mechanism.

Processor 202 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 202 could comprise processing components that are distributed across a plurality of physical computing devices connected via a network, such as a computing cluster of a public, private, or hybrid cloud.

In turn, data storage 204 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 204 may comprise computer-readable storage mediums that are distributed across a plurality of physical computing devices connected via a network, such as a storage cluster of a public, private, or hybrid cloud.

As shown in FIG. 2, data storage 204 may be provisioned with software components that enable the computing device 200 to carry out the operations disclosed herein. These software components may generally take the form of program instructions that are executable by the processor 202 to carry out the disclosed functions, which may be arranged together into software applications, virtual machines, software development kits, toolsets, or the like, all of which are referred to herein as a software tool or software tools. Further, data storage 204 may be arranged to store project-related data in one or more databases, file systems, or the like. Data storage 204 may take other forms and/or store data in other manners as well.

Communication interface 206 may be configured to facilitate wireless and/or wired communication with other computing devices or systems, such as one or more client stations 112 when computing device 200 serves as back-end computing platform 102, or back-end computing platform 102 when computing device 200 serves as one of client stations 112. As such, communication interface 206 may take any suitable form for carrying out these functions, examples of which may include an Ethernet interface, a serial bus interface (e.g., Firewire, USB 3.0, etc.), a chipset and antenna adapted to facilitate wireless communication, and/or any other interface that provides for wireless and/or wired communication. Communication interface 206 may also include multiple communication interfaces of different types. Other configurations are possible as well.

Although not shown, computing device 200 may additionally include one or more other interfaces that provide connectivity with external user interface equipment (sometimes referred to as "peripherals"), such as a keyboard, a mouse, a trackpad, a display screen, a touch-sensitive interface, a stylus, a virtual-reality headset, speakers, etc., which may allow for direct user interaction with computing device 200. Further, although not shown, computing device 200 may be a device, such as a smartphone, a laptop, a tablet, or a desktop, among other possibilities, that includes integrated user interface equipment, such as a keyboard, a mouse, a trackpad, a display screen, a touch-sensitive interface, a stylus, a virtual-reality headset, speakers, etc., which may allow for direct user interaction with computing device 200.

It should be understood that computing device 200 is one example of a computing device that may be used with the embodiments described herein. Numerous other arrangements are possible and contemplated herein. For instance, other computing devices may include additional components not pictured and/or more or fewer of the pictured components.

III. EXAMPLE OPERATIONS

As discussed above, when a construction project involves more than one currency, it may be necessary to include those currencies during financial management of the construction project. For instance, contracts, budgets, reports, expenditures, and other aspects of a construction project may need to take into account multiple currencies. In general, it is desirable for stakeholders (e.g., project owners, general contractors, subcontractors, specialty contractors, etc.) of a project to be able to manage, view, and/or otherwise present financial data (e.g., costs, expenses, etc.) in a given currency, such as a default currency of the project, at any given time. In this regard, when more than one currency is involved, there is a need for conversion between currencies during management of a construction project's financial operations. For example, construction projects may involve parties collaborating across one or more different geographical locations that use different currencies. For instance, a corporation (e.g., project owner) may be headquartered in the United States, which uses the currency United States Dollar (USD). That corporation may be responsible for financing a new construction project in England, which uses the currency Great British Pound (GBP), and may hire a construction company (e.g., general contractor) based in England to oversee the construction project. In turn, the construction company may hire a subcontractor from Ireland, which uses the currency Euro (EUR), to perform a given project task. Further, the subcontractor may procure materials from a vendor in Sweden, which uses the currency Swedish Krona (SEK). The parties may collaborate on the construction project electronically using construction management software as described above, such as the construction management software offered by Procore Technologies, Inc.

However, as described above, existing software technology for construction management, including the software tools described above, does not provide functionality that supports utilizing multiple currencies during financial management of a construction project, including selection of a desired project-specific currency and creation, modification, and/or tracking of financial data objects related to the construction project, which presents drawbacks in several areas of financial management.

As one example, existing software technology does not enable users affiliated with a given stakeholder (e.g., a project owner, a general contractor, etc.) to enter a project-specific currency for a construction project that is different from a default company currency associated with the given stakeholder (e.g., the default currency associated with the stakeholder's construction management software application account), which is typically set based on the location of the company. Therefore, when engaging in financial management of any construction project involving the stakeholder, users are currently required to manage the construction project in the default company currency, despite a preference or need to use a different currency necessitated by a construction project occurring in a location that uses the different currency. For instance, in the example above, the corporation may have a default company currency that matches the first currency because the corporation is headquartered in the first location that uses the first currency. Thus, the corporation is currently required to use the first currency to manage the project's finances, even if the corporation wishes to manage the project's finances in the second currency because the project is located in the second location that uses the second currency, which in turn requires conversion (e.g., manually or using a tool that is external to the construction management software) of financial information between the second currency and the first currency in order to manage project finances in the first currency.

As another example, at the time of creating or modifying a "commitment" data object (e.g., a subcontract between a general contractor and a subcontractor), existing software technology does not enable a user to enter a currency for the "commitment" data object that is different from a default project currency for the construction project (which, as explained above, by default matches a default company currency). Thus, if the "commitment" data object involves parties that prefer or are required (e.g., due to location) to use different currencies (e.g., the general contractor uses a second currency and the subcontractor uses a third currency), a user that prefers or is required to use a desired currency that is different from the default project currency is currently required to convert (e.g., manually or using a tool that is external to the construction management software) any SOV line items for the "commitment" data object from the desired currency to the default project currency when creating or modifying the "commitment" data object, and is then required to track all future expenditures related to the SOV line items in that default project currency rather than the user's desired currency.

As yet another example, existing software technology does not enable reporting information (e.g., budgets, invoices, costs, etc.) to be generated in a desired currency that is different from the default project currency. Thus, a user that prefers to view reporting information in a desired currency that is different from the default project currency would need to convert the reporting information from the default project currency to the desired currency.

To illustrate, consider the example above. Because the construction project is located in England, the construction project's default project currency may be set to GBP. The general contractor and the subcontractor may wish to memorialize a subcontract by creating a subcontract data object in the construction management software. The subcontract may comprise an SOV detailing labor costs for the subcontractor's performance of the given project task. The subcontractor may wish to enter an SOV financial line item in EUR. However, due to the constraints of existing technology as discussed above, the subcontractor is currently required to enter his expected labor costs in GBP, which may involve first converting his expected labor costs from EUR to GBP, and then entering the labor costs in GBP. Further, the subcontractor may wish to enter, for a purchase order data object, an SOV line item detailing expected materials costs for the given project task. The subcontractor may wish to enter the expected materials costs in SEK. However, due to the constraints of existing technology as discussed above, the subcontractor instead is currently required to enter the materials costs in GBP, which may involve first converting the materials costs from SEK to GBP, and then entering the materials costs in GBP. Still further, the corporation may wish to perform cost projections, assessments, budget monitoring, and/or other financial data tracking throughout the course of the construction project. The corporation may wish to view such information in USD. However, due to the constraints of existing technology as discussed above, viewing such information may require first generating the desired reports in GBP, and then converting the information from GBP to USD. The inability to create, modify, and/or track financial data objects can be burdensome, challenging, costly, and may result in financial inaccuracies. Other existing software tools for creating, modifying, and/or tracking financial data objects related to a construction project present similar drawbacks.

Thus, while software technology for managing the financial operations of a construction project does exist, including but not limited to the financial management software tools offered by Procore Technologies, Inc., the existing software technology fails to address many of the challenges of financial management presented by the involvement of multiple currencies. As a result, managing the financial operations of a construction project that involves two or more different currencies—including, but not limited to, cost projections, contracting, invoicing, reporting, and budgeting—can become time-consuming, tedious, and costly, and may result in increased accounting discrepancies and client dissatisfaction.

To address these and other shortcomings, disclosed herein is new software technology that improves upon existing technology for financial management of a construction project involving multiple currencies. At a high level, the disclosed software technology enables customization of currency settings at one or both of a company level or a project level, and further enables defining, for each financial data object comprising one or more financial line items related to a construction project, a data object-specific currency and a data object-specific currency exchange rate that is to be used for conversions between the data object-specific currency and one or more other currencies (e.g., a project-level currency). This software technology includes various aspects.

In a first aspect, the disclosed software technology provides one or more graphical user interface ("GUI") views that enable a user to define currency settings at a company level, such as a default currency for the company, that can be used in connection with construction projects involving the company, a set of other available currencies that can be used in connection with construction projects involving the company, a "current" effective exchange rate for each available currency, and/or a listing of prior exchange rates for each available currency. As will be described in further detail below, the one or more GUI views for defining company-level currency settings may take various forms.

In a second aspect, the disclosed software technology provides one or more GUI views that enable a user to define currency settings at a project level, such as a default currency for a given project, that can be used when creating and/or modifying financial data objects for a given project, an exchange rate for use in converting between the project's default currency and the company's default currency, and a set of other available currencies that can be used when creating and/or modifying financial data objects for the project. As will be described in further detail below, the one or more GUI views for defining project-level currency settings may take various forms.

In a third aspect, the disclosed software technology provides one or more GUI views for defining, for each financial data object comprising one or more financial line items related to a construction project, a data object-specific currency and a data object-specific currency exchange rate that is to be used for conversions between the data object-specific currency and one or more other currencies. As will be described in further detail below, this set of one or more GUI views for defining a data object-specific currency and a data object-specific currency exchange rate may take various forms.

This software technology improves upon several aspects of financial management of data related to a construction project, including defining company-level currency settings, defining project-level currency settings, and creating and/or modifying financial data objects, as will be discussed in more detail below.

Example operations that may be carried out by one or more computing devices running the disclosed software technology are discussed in further detail below. For purposes of illustration only, these example operations are described in the context of one or more client stations that interact with a back-end computing platform running a SaaS application that incorporates the disclosed software technology. The one or more client stations may be, for example, the client stations 112 of FIG. 1, and the back-end computing platform may be, for example, the back-end platform 102 of FIG. 1. As described above, the computing device 200 may serve as one or more of client stations 112 and/or back-end platform 102 shown in FIG. 1. In this respect, it should be understood that, depending on the implementation, the operations discussed herein below may be carried out by a combination of computing devices, with some operations being carried out by back-end platform 102 (such as computational processes and data-access operations) and other operations being carried out by one or more of client stations 112 (such as display operations and operations that receive user inputs). However, other arrangements are possible as well.

a. Company-Level Currency Settings

As noted above, in a first aspect, the disclosed software technology provides a GUI that includes one or more GUI views that enable a user to define currency settings at a company level, such as a default currency for the company, that can be used in connection with construction projects involving the company, a set of other available currencies that can be used in connection with construction projects involving the company, a "current" effective exchange rate for each available currency, and/or a listing of prior exchange rates for each available currency. The one or more GUI views for defining company-level currency settings may be referred to herein as a "company-level currency settings interface" and may take various forms.

In practice, to define currency settings at a company level, a user may access a construction management SaaS application that incorporates the disclosed software technology. The user may access the SaaS application via a client station that is configured to communicate with a back-end computing platform, such as the back-end computing platform 102, that is running the SaaS application. The back-end computing platform may cause the client station to display a GUI that the user may use to navigate to one or more views for defining company-level currency settings.

Figure 3A:
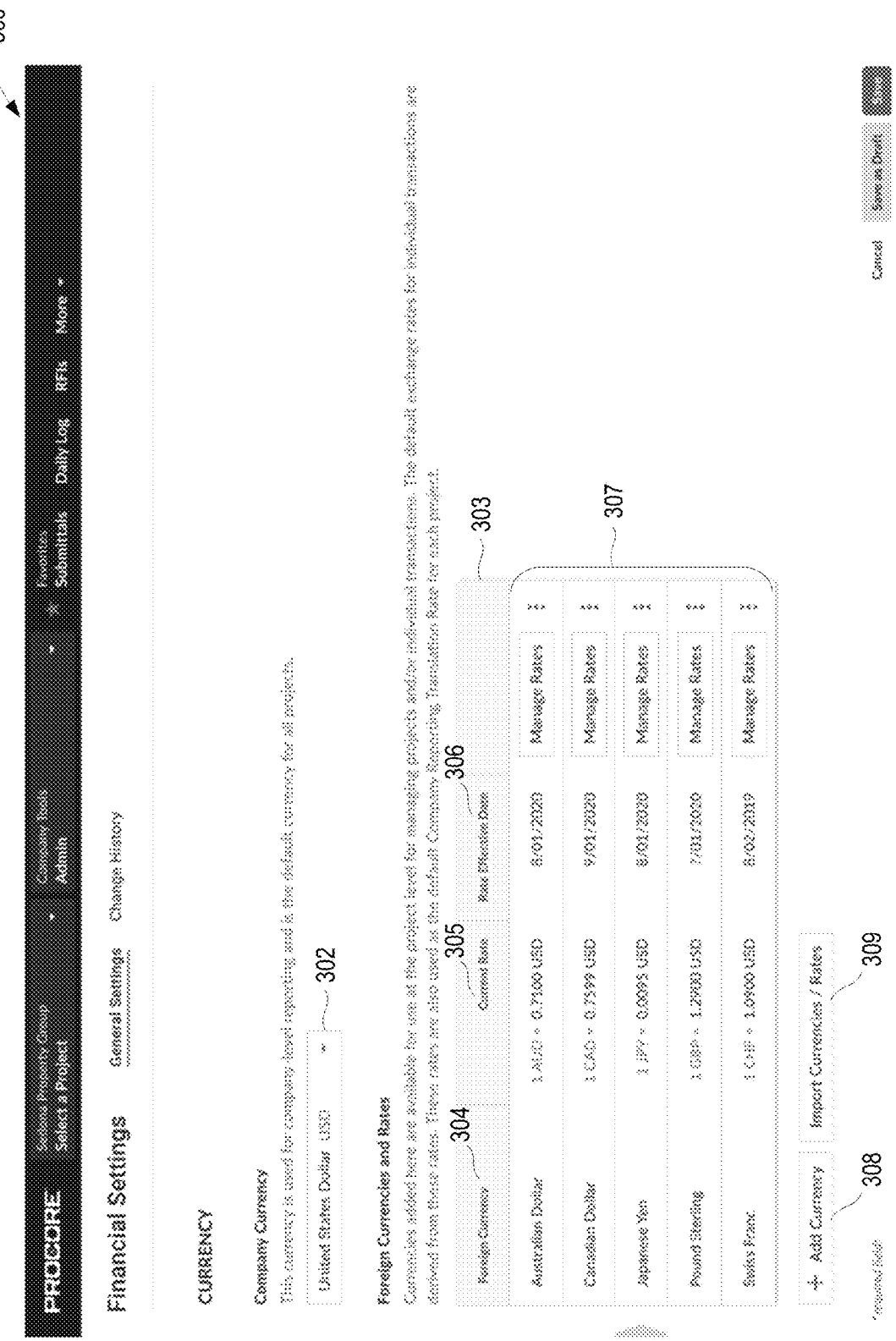
FIG. 3A-3B depict example views of an interface that may be used for defining company-level currency settings according to example embodiments of the disclosed software technology.

FIG. 3A depicts an example GUI view 300 that may be presented to a user (e.g., a construction professional) affiliated with a company (e.g., a project owner) for defining currency settings at a company level. In one aspect, currency settings that may be defined at a company level may include a company currency. The company currency may be a designated currency that may be used for company-level financial management related to one or more construction projects involving the company. For example, the company currency may be used for projections, budgets, contracts, invoices, and reports related to one or more construction projects involving the company, among other possibilities. The company currency may also be used as a default project currency for construction projects involving the company, as will be explained in more detail further below.

The back-end computing platform may cause the user's client station to display, via the GUI, a view that includes a set of one or more currency options that are selectable by the user to define a given currency option that is to be designated as the company currency. The back-end computing platform may determine the set of one or more currency options in various ways. As one possibility, the back-end computing platform may determine the set of one or more currency options based on global currencies that are in circulation as of the date the user is defining the company currency. As another possibility, the back-end computing platform may determine the set of one or more currency options based on information about the company (e.g., a geographical location of the company). As yet another possibility, the back-end computing platform may determine the set of one or more currency options based on a predefined set of currencies. The back-end computing platform may determine the set of one or more currency options in other ways as well.

Regardless of how the back-end computing platform determines the set of one or more currency options, the back-end computing platform may then cause the client station to present to the user. the determined set of one or more currency options. The set of one or more currency options may be presented to the user in various ways. As one possibility, the set of one or more currency options may be presented via a drop-down menu of the company-level currency settings interface, whereby the user may select a given currency that is to be designated as the company currency. As another possibility, the set of one or more currency options may be presented as a radio button list of currencies, whereby the user may select a given currency that is to be designated as the company currency. Other examples are also possible. As shown in FIG. 3A, after being presented with the set of one or more currencies, the user may have selected USD as the company currency 302.

In another aspect, currency settings that may be defined at a company level may include a set of one or more additional currencies that are different from (e.g., foreign to) the company currency and a "current" effective exchange rate for each such additional currency. The set of one or more additional currencies that are defined at the company level may be used for defining project-level currency settings, as will be explained in more detail further below. The one or more additional currencies may be defined in various ways.

As one possibility, the back-end computing platform may enable the user to define one or more additional currencies by causing the user's client station to display an option to create a set of one or more additional currencies. The option to create a set of one or more additional currencies may be presented to the user via a selectable GUI button, such as the "+ Add Currency" GUI button 308 of FIG. 3A. After selecting the GUI button 308, the user may be presented with a selectable list of one or more currencies (excluding the currency that has been designated as the company currency). The selectable list may be presented to the user in various ways, including those described above with reference to the company currency, such as via a drop-down menu, a radio button list, a checkbox list, etc., among other possibilities. The user may then select one or more currencies to create the set of one or more additional currencies. FIG. 3A shows an example set of additional currencies 303 that includes a list of one or more currencies 304 that have been selected by the user. As shown, the user may have selected the Australian Dollar (AUD), the Canadian Dollar (CAD), the Japanese Yen (JPY), the Pound Sterling (GBP) (which is also generally referred to as Great British Pound), and the Swiss Franc (CHF).

As another possibility, the GUI view(s) may present an option for the user to import one or more currencies from an external source. For instance, the back-end computing platform may cause the user's client station to display an import GUI button, such as the GUI button 309, that enables the user to access an importing pane, whereby the user may import one or more currencies to include in the list of currencies 304. As one example, the back-end computing platform may enable the user to import currencies via a file, such as a comma-separated values file, that comprises currency information. Other examples are also possible.

Further, for each of the additional currencies, the back-end computing platform may enable the user to access an exchange rate pane, whereby the user may enter a respective exchange rate for converting between the additional currency and the company currency and a corresponding "effective" date indicating when the respective exchange rate became effective. Entering a respective exchange rate for each additional currency may take various forms. As one possibility, the user may be presented with an alphanumeric text field whereby the user may enter a numerical and/or alphanumeric value indicating an exchange rate for the additional currency that is to be used as a current exchange rate for converting between the additional currency and the company currency. As another possibility, the user may be presented with one or more selectable options whereby the user may select an exchange rate that is to be used for the additional currency. As yet another possibility, the back-end computing platform may enable the user to import one or more exchange rates for a given additional currency. The user may import one or more exchange rates by accessing the importing pane using an "import" GUI button, such as the GUI button 309, as described above with respect to importing one or more currencies. As one example, the back-end computing platform may enable the user to provide a file, such as a comma-separated values file, comprising currency exchange rate information, that may then be imported by the back-end computing platform. As another example, the back-end computing platform may import one or more exchange rates via an Application Programming Interface (API), which may be defined by the user. Other examples of defining exchange rates are also possible.

Entering a corresponding "effective" date for each exchange rate may take various forms. As one possibility, the user may be presented with a text field whereby the user may enter a numerical and/or alphanumeric value indicating a given date. As another possibility, the user may be presented with an option to select a given date from one or more date options. For instance, the user may be presented with a pop-up window displaying a calendar view whereby the user may select a given date. As yet another possibility, the back-end computing platform may automatically populate the date with the current date on which the user is entering the exchange rate. Other examples of defining an "effective" date for a given exchange rate are also possible.

Further still, as another possibility, the user may define for each additional currency a respective rate schedule comprising one or more exchange rates and corresponding dates and then select from the one or more exchange rates a given exchange rate that is to be used as a current exchange rate for converting between the additional currency and the company currency. The user may define the rate schedule at the time of initially configuring company-level currency settings. Additionally, or alternatively, the user may define and/or modify the rate schedule at a later time. Defining an exchange rate schedule may take various forms. For instance, the back-end computing platform may enable the user to define a respective rate schedule for each additional currency by causing the user's client station to include in the GUI view a respective GUI button (or the like) for each additional currency that, when selected, causes the client station to present a rate schedule pane. For example, as shown in FIG. 3A, the back-end computing platform may cause the user's client station to display a respective "Manage Rates" GUI button 307 for each additional currency in the list of currencies 304. Selecting the GUI button 307 may cause the user to be presented with a rate schedule pane, whereby the user may define one or more prior exchange rates and corresponding dates for the additional currency. The rate schedule pane may enable the user to define for each additional currency one or more exchange rates and corresponding "effective" dates. The rate schedule pane may take various forms.

In general, the rate schedule pane may comprise two input areas—one for inputting an exchange rate, and one for inputting a corresponding "effective" date. As one example, to define an exchange rate, the user may be presented with a text field whereby the user may enter a numerical and/or alphanumeric value indicating an exchange rate that is to be used for the additional currency. As another example, to enter a corresponding "effective" date for each exchange rate, the user may be presented with a text field whereby the user may enter a numerical and/or alphanumeric value indicating a given date. As yet another example, to enter a corresponding "effective" date for each exchange rate, the user may be presented with an option to select a given date from one or more date options. For instance, the user may be presented with a pop-up window displaying a calendar view whereby the user may select a given date. As still another example, the back-end computing platform may automatically populate the date with the current date on which the user is entering the exchange rate. Other examples for entering exchange rates and corresponding "effective" dates in a rate schedule are also possible. Each exchange rate and corresponding "effective" date that is entered is stored by the back-end computing platform. In this regard, the rate schedule pane may also include an area for displaying a list of one or more previously entered exchange rates and corresponding "effective" dates for the additional currency that may provide historical information about the additional currency's exchange rate(s) and corresponding effective date(s) throughout the duration of a construction project.

Figure 3B:
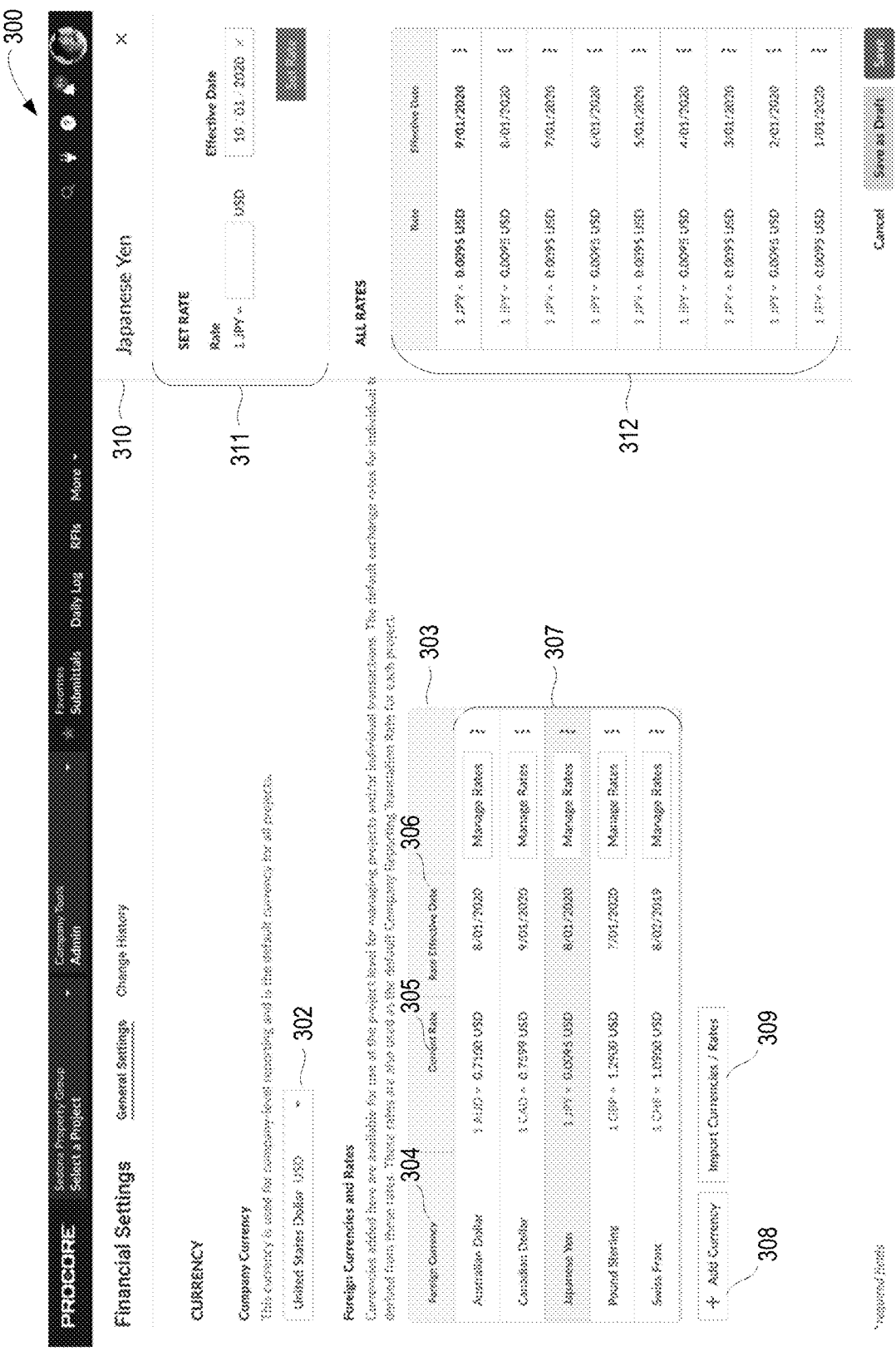

FIG. 3B shows an example rate schedule pane 310 that enables the user to define a rate schedule for one of the additional currencies in the list of currencies 304, such as Japanese Yen (JYP). As shown, the user may have selected the respective "Manage Rates" GUI button 307 for JPY to define a rate schedule for conversion between JPY and the company currency 302, which is USD. The rate schedule pane 310 may enable the user to enter one or more new exchange rates and corresponding effective dates via an area 311. The user may enter one or more exchange rates and corresponding effective dates as described above. Additionally, the rate schedule pane 310 may present a list 312 of previously-entered exchange rates and corresponding effective dates. The user may then select a given exchange rate and corresponding effective date that is to be used for converting between the additional currency and the company currency.

After receiving an indication of the user's input for each defined currency setting, including the company currency, any additional currencies, and respective exchange rates and corresponding effective dates for each additional currency, the back-end computing platform may store data indicating each defined currency setting such that the currency settings may thereafter be viewed, modified, and/or otherwise accessed by the user (or one or more other authorized users). In this regard, as one possibility, the back-end computing platform may store data corresponding to each defined currency setting based on receiving an indication from the user's client station as each currency setting is defined. As another possibility, the back-end computing platform may store the defined currency settings together based on receiving an indication from the user's client station comprising the user's collective inputted data. As yet another possibility, the back-end computing platform may store data based on a combination of the two types of indications. Other examples are also possible.

Regardless of how the current exchange rate for each additional currency is defined, the back-end computing platform may cause the user's client station to display the selected exchange rate and corresponding effective date in the set of additional currencies. As shown in FIG. 3A, the set of additional currencies 303 may include, for each additional currency in the list of currencies 304, a respective "current" exchange rate 305 and a corresponding "effective" date 306 for the exchange rate 305.

As mentioned above, currency settings that are defined at a company level may be used in various ways. As one example, the company-level currency settings may be used to view financial reporting information related to the company. As another example, the company-level currency settings may be used to define one or more currency settings at a project level, as will be explained in more detail further below. The company-level currency settings may be used in other ways as well.

b. Project-Level Currency Settings

As noted above, in a second aspect, the disclosed software technology provides a GUI that includes one or more GUI views that enables a user to define currency settings at a project level, such as a default currency for a given project, an exchange rate for use in converting between the project's default currency and the company's default currency, and a set of other available currencies that can be used when creating and/or modifying financial data objects for a given project. The one or more GUI views for defining project-level currency settings may be referred to herein as a "project-level currency interface," and may take various forms.

In practice, to define currency settings at a project level, a user may access the SaaS application that incorporates the disclosed software technology via a client station that communicates with a back-end platform that is running the SaaS application, as described above. The user may then navigate to the project-level currency interface for defining project-level currency settings.

In one aspect, currency settings that may be defined at a project level may include a project currency that may be used for project-level financial management of the given construction project. For example, the project currency may be used for projections, budgets, contracts, invoices, and reports related to the given construction project, among other possibilities. The back-end computing platform may cause the user's client station to display, via the project-level currency interface, a set of one or more currency options that are selectable by the user to define a given currency that is to be designated as the project currency for the given construction project. The back-end computing platform may determine the set of one or more currency options for the project currency in various ways.

As one possibility, the back-end computing platform may determine the set of one or more currency options based on previously-defined company-level currency settings. For example, the back-end computing platform may determine that a company currency and one or more additional currencies have been defined at the company-level currency settings, in which case the back-end computing platform may determine the set of one or more currency options for the project currency to include at least the company currency and the one or more additional currencies (perhaps among other possible currency options). As another possibility, the back-end computing platform may determine the set of one or more currency options based on global currencies that are currently in circulation as of the date that the user is defining the project currency. As still another possibility, the back-end computing platform may determine the set of one or more currency options based on information about the project (e.g., a geographical location of the project). As yet another possibility, the back-end computing platform may determine the set of one or more currency options based on a predefined set of currencies. The back-end computing platform may determine the set of one or more currency options in other ways as well.

After determining the set of one or more currency options, the back-end computing platform may cause the determined set of one or more currency options to be presented to the user via the interface displayed at the user's client station. The back-end computing platform may cause the determined set of one or more currency options to be presented in various ways, including those described above, such as via a selectable list of currencies (e.g., a drop-down menu, a radio button list, etc.) whereby the user may select a given currency that is to be designated as the project currency for the given construction project.

In implementations where the back-end computing platform has determined that a company currency has been previously defined, the back-end computing platform may also initially set the project currency, by default, to match the company currency. On the other hand, in implementations where the back-end computing platform has determined that a company currency has not been defined, the back-end computing platform may notify the user that a company currency has not previously been defined, prompt the user to set a company currency, and/or automatically define the company currency to match the selected project currency. In either case, the currency that is ultimately designated as the project currency could either be the same as the currency that has been designated as the company currency or could be different from the currency that has been designated as the company currency.

Where the project currency is different from the company currency, the project-level currency interface may further enable the user to specify a project-specific exchange rate between the project currency and the company currency. In this regard, the back-end computing platform may cause the user's client station to present, via the project-level currency interface, one or more project-specific exchange rate options from which the user may select a given project-specific exchange rate. As one possibility, the user may be presented with an option to select a "floating" exchange rate that is to be used for converting between the project currency and the company currency. The floating exchange rate option may be an exchange rate between the project currency and the company currency that is dynamically updated based on market exchange rate fluctuations of one or both of the project currency or the company currency. As another possibility, the user may be presented with a "fixed" exchange rate option that enables the user to enter a given exchange rate that is to be used for converting between the project currency and the company currency. The fixed exchange rate between the project currency and the company currency remains firm throughout the duration of the project (unless modified) despite any market fluctuations in either currency. Advantageously, such a fixed exchange rate option may enable the user to enter a specific project-level currency exchange rate that may have been agreed upon between the parties involved in the construction project. As yet another possibility, the user may be presented with a "look-up" option that enables the user to enter a given date and then presents the user with an exchange rate for converting between the project currency and the company currency based on the given date. Other options are also possible.

In another aspect, currency settings that may be defined at a project level via the project-level currency interface may include a set of one or more additional currencies that are available for use in creating and/or modifying financial data objects for the given construction project, as will be explained in more detail further below. The set of one or more additional currencies may be defined in various ways. As one possibility, the user may be presented with a list of additional currencies comprising the company currency (if previously defined) and any previously-defined company-level additional currencies, whereby the user may select one or more of the additional currencies that may thereafter be available for use in creating and/or modifying financial data objects for the given construction project. As another possibility, the user may be presented with a list of additional currencies based on historical information about the company, such as one or more currencies that are frequently used on projects involving the company and/or one or more currencies that were used on recently-completed projects involving the company. Other examples are also possible.

Figure 4:
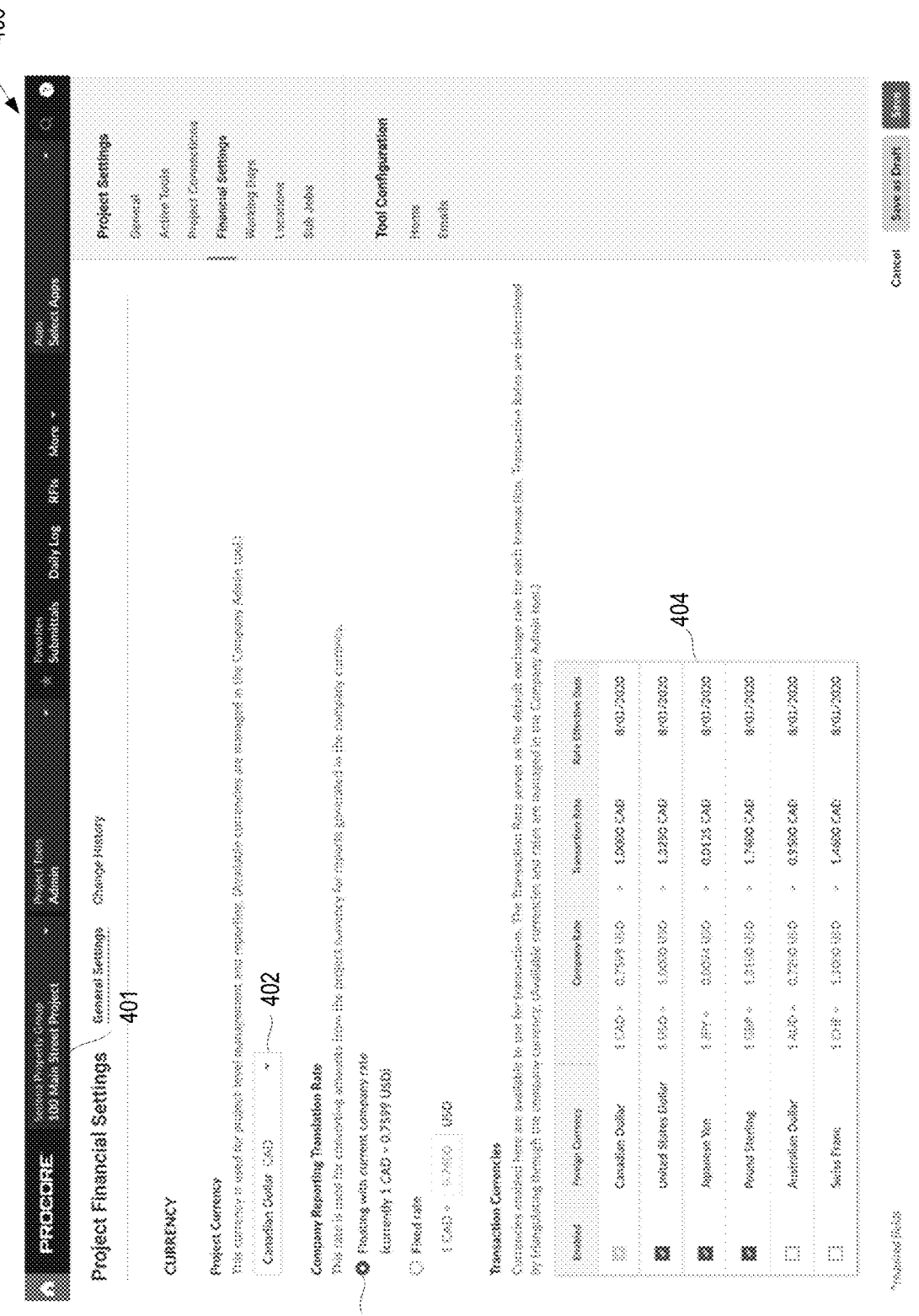
FIG. 4 depicts an example view of an interface that may be used for defining project-level currency settings according to an example embodiment of the disclosed software technology.

FIG. 4 depicts an example view 400 of an example interface that may be presented to a user for defining project-level currency settings for a given construction project. For purposes of illustration, this example assumes that the user has previously entered company-level currency settings as discussed above with reference to FIGS. 3A-3B. As shown in FIG. 4, the user has used the project-level currency interface to select the Canadian Dollar (CAD) as the project currency 402 and to select a floating exchange rate for converting between the project currency (CAD) and the previously-defined company currency (USD). Based on the user's selection of the floating exchange rate option, the view 400 may display a current exchange rate of conversion between the project currency and the company currency as of the date that the user is defining the project currency. As shown, the view 400 may also include a list of currencies 404 that may be used for creating and/or modifying financial data objects for the given construction project. The list of currencies 404 may include the project currency (CAD), the company currency (USD) that was previously defined via the example company-level currency settings interface shown in FIGS. 3A-3B, and one or more additional currencies that are available for use by the company (JPY, GBP, AUD, CHF), which may have previously been defined via the company-level currency interface. Along with these currencies, the project-level currency interface may present a selectable option for enabling or disabling each currency in the list for use on the given construction project. For example, as shown in FIG. 4, the additional currencies USD, JPY, and GBP, have been enabled for use on the given construction project 401, indicating that those currencies may be used for creating and/or modifying financial data objects for the given construction project. Further, as shown, the project currency (USD) may be displayed as a grayed-out option such that it may not be disabled, indicating that the project currency will always be available for use in creating and/or modifying financial data objects for the given construction project, which will now be explained in more detail.

c. Creating and/or Modifying Financial Data Objects

As noted above, in a third aspect, the disclosed software technology provides a GUI that includes one or more GUI views for creating or modifying a financial data object comprising one or more financial line items. A financial data object may take various forms, some examples of which may include (i) a "prime contract" data object that represents an agreement between a project owner that is responsible for financing the construction project and a contractor (e.g., general contractor, subcontractor, specialty contractor, etc.) that is responsible for completing the work related to the construction project, (ii) a "subcontract" data object that represents an agreement between a party of a prime contract and a third-party subcontractor for work related to the construction project, (iii) a "purchase order" data object that details the types, quantities, and agreed-upon prices for products and/or services, (iv) an "invoice" data object that represents an itemized financial record of a transaction for the purchase of goods and services between two parties, and (v) a "change order" data object that represents a modification to a contract's original scope of work. The one or more GUI views for creating or modifying a financial data object may herein be referred to as a "financial data object interface" and may take various forms.

The financial data object interface for creating or modifying a financial data object comprising one or more financial line items may present a user with (i) a set of one or more currency options that are selectable by the user in order to specify a data object-specific currency for the financial data object being created or modified and (ii) a set of one or more exchange rate options that are selectable by the user in order to specify a data object-specific exchange rate for the financial data object being created or modified that is to be used for conversion between the data object-specific currency and another currency, such as a project-level currency for the construction project. In this respect, the set of one or more currency options and the set of one or more exchange rate options that are presented to the user may take various forms and may be determined in various manners.

In practice, to create or modify a financial data object, a user may access the SaaS application that incorporates the disclosed software technology via a client station that communicates with a back-end platform that is running the SaaS application, as described above. The user may then navigate to the financial data object interface for creating or modifying a financial data object, which will now be described in more detail with respect to FIG. 5, which depicts a flow diagram of an example process 500 that may be performed by a back-end computing platform in accordance with the software technology disclosed herein, as well as in FIGS. 6A-6D, which depict one or more example GUI views that may be displayed to a user for creating and/or modifying a financial data object.

Figure 5:
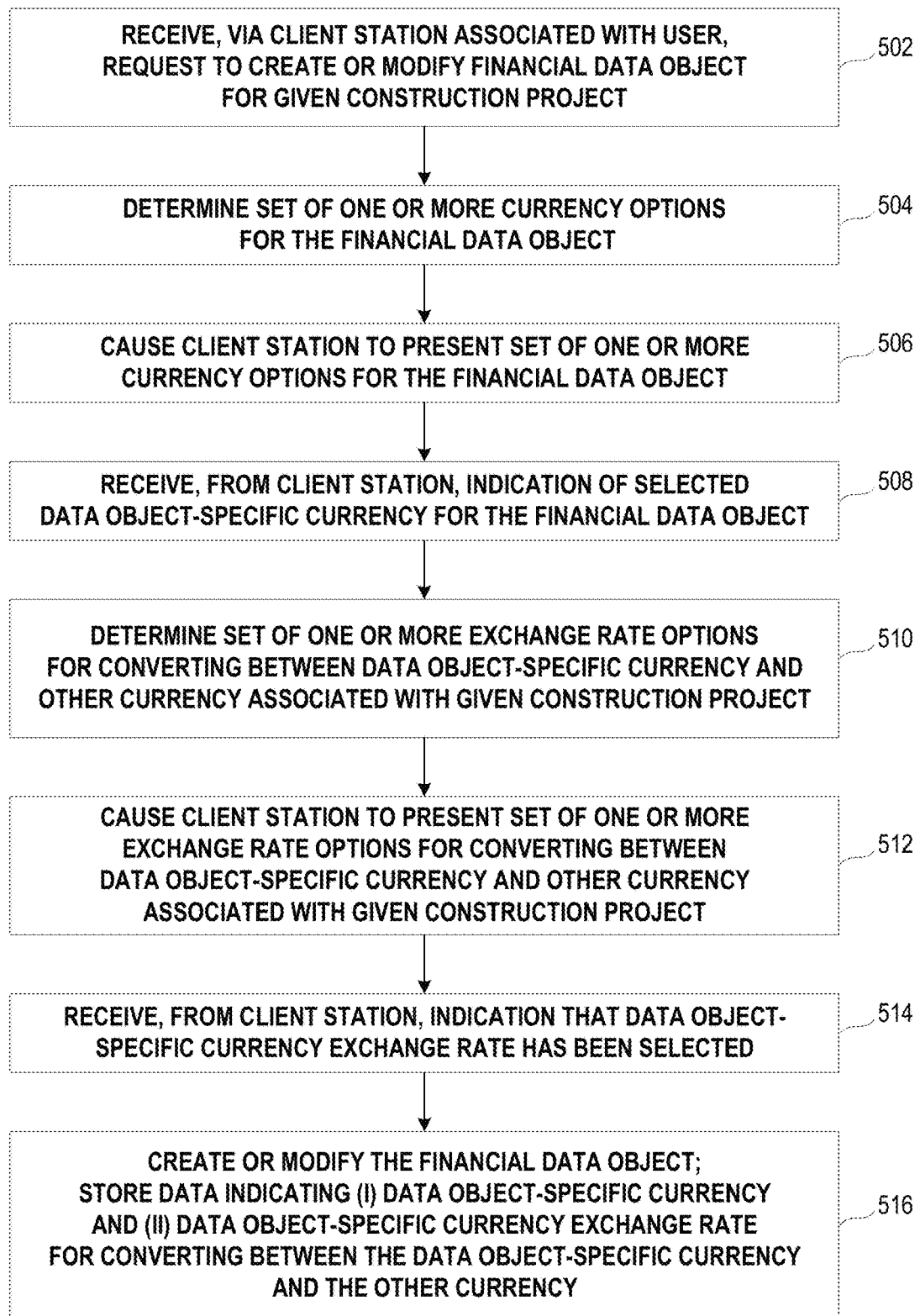
FIG. 5 depicts an example process for creating or modifying a financial data object according to an example embodiment of the disclosed software technology.

Beginning first with reference to FIG. 5, it should be understood that each block in the example process 500 may represent a module or portion of program code comprising instructions that are executable by a processor to implement specific logical functions or steps in the process 500. The program code may be stored on any type of computer-readable medium, such as non-transitory computer readable media (e.g., data storage 204 shown in FIG. 2). In other cases, a block in a flow diagram may represent circuitry that is wired to perform specific logical functions or steps in a process. Moreover, the blocks shown in the flow diagrams may be rearranged into different orders, combined into fewer blocks, separated into additional blocks, and/or removed, based upon the particular embodiment. The example process 500 may also be modified to include additional blocks that represent other functionality that is described expressly or implicitly elsewhere herein.

Further, as a general matter, for purposes of illustration, the functions described in the example process 500 are described as being performed by a back-end computing platform that communicates with a client station to provide a SaaS application including the disclosed software technology. However, as noted above, other implementations are also possible.

The example process may begin at block 502, where the back-end computing platform may receive a request from the user's client station to create a financial data object for a given construction project.

At block 504, the computing platform may determine any information that is to be pre-populated in an interface for creating or modifying the financial data object. Such information may include a set of one or more currency options that is to be presented to the user for defining a data object-specific currency for the financial data object. The back-end computing platform may make this determination in various ways. As one possibility, the back-end computing platform may determine the set of one or more currency options based on previously-defined project-level and/or company-level currency settings. For example, the back-end computing platform may determine that one or more of a project currency, a company currency, or additional currencies have been defined at a company level and/or a project level. Therefore, the back-end computing platform may determine that the set of one or more currency options that is to be presented to the user for creating or modifying the financial object should include the company currency, the project currency, and/or the additional currencies. As another possibility, the back-end computing platform may determine the set of one or more currency options based on a predefined list of available currencies (e.g., an ISO currency standard). Other examples are also possible.

Further, in some implementations, the back-end computing platform's determination of which currency option(s) to present to the user may additionally be based on other factors. One such possibility may be information about the user that is creating or modifying the financial object, such as the user's profile information and/or permissions information. In this regard, the back-end computing platform's determination may involve determining a permission level —such as a categorical permissions level (e.g., administrator, manager, owner, standard, etc.) or a threshold permission level—that is associated with the user. If the back-end computing platform determines that the user has a higher level of permissions or meets a permission-level threshold, the back-end computing platform may enable the user to access and/or select certain currency option(s) by causing those certain currency option(s) to be presented to the user, whereas if the back-end computing platform determines that the user has a lower level of permissions or does not meet the permission-level threshold, the back-end computing platform may restrict the user from accessing and/or being able to select certain currency option(s) by causing those certain currency option(s) to not be presented to the user. For instance, users having a higher level of permissions (e.g., administrator-level permissions) may be presented with a broader set of currency options, whereas users having a lower level of permissions (e.g., standard-level permissions) may be presented with a more limited set of currency options. For example, a user having a higher level of permissions may be presented with a set of currency options that includes a company currency, a project currency, any additional currencies that were defined at a company and/or project level, and an option to enter one or more other currencies, whereas a user having a lower level of permissions may be presented with a set of currency options that includes only a company currency, a project currency, and any additional currencies that were defined at a company and/or project level. Advantageously, determining the currency option(s) based on user permissions and/or profile information as described above may facilitate enforcement of increased security measures surrounding modification and/or management of currency selection by enabling users to access and/or select certain currency options or restricting users from accessing and/or being able to select certain currency options based on determining their respective user permissions. Other examples are also possible.

Another possibility may be information about the particular financial data object being created or modified, such as location information for one or more parties associated with the financial data object. For instance, the back-end computing platform may determine that a party associated with the financial data object that is being created or modified is located in a geographical area that uses a currency that that does not match any of the company currency, the project currency, or any additional currencies that were defined at the company and/or project level. Therefore, the back-end computing platform may determine that the set of currency option(s) that is to be presented to the user should include the company currency, the project currency, the additional currencies that were defined at the company and/or project level, and also the currency of the geographical area where the party associated with the financial data object is located. Yet another possibility may be information about one or more data objects that are related to the particular financial data object being created or modified. For instance, the back-end computing platform may determine that the particular financial data object being created or modified is a financial data object (e.g., a change order, an invoice, etc.) that is related to an existing financial data object (e.g., a change event, a prime contract, a subcontract, etc.). Therefore, the back-end computing platform may determine that the particular financial data object being created or modified should "inherit" the currency of the existing financial data object to which it is related. In such instances, the back-end computing platform may determine that the set of currency option(s) that is to be presented to the user should include the currency of the related existing financial data object and may additionally cause the currency of the related existing financial data object to be pre-selected as a default currency of the particular financial data object when the set of currency option(s) is presented to the user, as will be discussed in more detail below. Other examples are also possible.

At block 506, after determining the set of one or more currency options, the back-end computing platform may cause the user's client station to display, via the interface, the set of one or more currency options that are selectable by the user to specify a data object-specific currency for the financial data object that is being created or modified. The set of one or more currency options may be presented to the user in response to receiving a user input for displaying the currency option(s), such as selecting a drop-down menu, among other examples. The set of one or more currency options may be presented to the user in various ways. As one possibility, the set of one or more currency options may be presented via a drop-down menu, whereby the user may select a given currency from the menu that is to be designated as the data object-specific currency. As another possibility, the set of one or more currency options may be presented as a radio button list, whereby the user may select a given currency's respective radio button to designate the given currency as the data object-specific currency. Other examples are also possible.

After the user has provided an input selecting a data object-specific currency, at block 508, the back-end computing platform may receive, via the client station, an indication that the user has selected the data object-specific currency for the financial data object. In turn, the back-end computing platform may cause the financial data object interface to be updated in a manner that enables the user to specify a data object-specific currency exchange rate for converting between the data object-specific currency and another currency, such as the project currency.

To facilitate this functionality, at block 510, the back-end computing platform may determine a set of one or more currency exchange rate options that is to be presented to the user. In this respect, the currency exchange rate options that may be included within the set of one or more currency exchange rate options may take various forms.

As one possibility, the set of one or more currency exchange rate options may include a "current" exchange rate for converting between the data object-specific currency and the project currency, which comprises the most-recent exchange rate that has been made available to the software technology at the time that the financial data object is being created or modified.

As another possibility, the set of one or more currency exchange rate options may include an exchange rate for converting between the data object-specific currency and the project currency that is tied to a relevant date associated with the financial data object, which may vary depending on the type of financial data object. For example, if the financial data object comprises a "commitment" data object that represents a contract or purchase order, the set of one or more currency exchange rate options may include an exchange rate associated with the date on which the commitment was previously created (if applicable), the date on which the commitment was formally executed, or the effective date of the commitment, among other possibilities. As another example, if the financial data object comprises an "invoice" data object, the set of one or more currency exchange rate options may include an exchange rate associated with the date on which the invoice was billed, the date on which the billing period started, or the date on which the billing period ended, among other possibilities.

As yet another possibility, the set of one or more currency exchange rate options may include a "custom" option that enables the user to enter some other exchange rate for converting between the data object-specific currency and the project currency. Advantageously, such a custom option may enable a user to enter a specific object-specific currency exchange rate that may have been agreed upon between parties involved in the given construction project. As still another possibility, the set of one or more currency exchange rate options may include a "look-up" option that enables the user to enter a given date and then presents the user with an exchange rate associated with the given date that can be used for converting between the data object-specific currency and the project currency.

The set of one or more currency exchange rate options may include other types of exchange rate options as well, and the current, date-specific, and "lookup" exchange rate values that are presented to the user may also be determined in various manners, including by accessing exchange rate information that has previously been imported into the software (e.g., via a company-level currency interface) and/or by obtaining exchange rate information via an API, among other possibilities.

Further, the back-end computing platform's determination of which currency exchange rate option(s) to include in the set of one or more currency exchange rate options to be presented to the user may additionally be based on various factors.

As one possibility, the back-end computing platform's determination of which currency exchange rate option(s) are to be presented to a user that is creating or modifying a financial data object may be based on a current status of the financial data object—that is, whether the user is creating a new financial data object or modifying a previously-created financial data object. In such an implementation, a more limited set of currency exchange rate option(s) may be presented to a user that is creating a new financial data object because certain types of exchange rate options may not be applicable to the creation of a new financial data object (e.g., an exchange rate associated with the prior creation date of the financial data object), whereas a broader set of options may be presented to a user that is modifying a previously-created financial data object. For example, if a user is creating a new financial data object, the set of one or more exchange rate options may include a "current" exchange rate (e.g., the most-recent effective exchange rate that has been made available to the software technology at the time that the financial data object is being created) for converting between the data object-specific currency and the project currency, perhaps along with a custom option and/or date lookup option but may not include any date-specific exchange rate options. On the other hand, if a user is modifying a previously-created data object, the set of one or more currency exchange rate options may include both a current exchange rate for converting between the data object-specific currency and the project currency and also an exchange rate associated with a prior creation date of the financial data object (and/or some other date relevant to financial data object), perhaps along with a custom option and/or date lookup option.

As another possibility, the back-end computing platform's determination of which currency exchange rate option(s) are to be presented to a user that is creating or modifying a financial data object may be based on information about the user that is creating or modifying the financial object, such as the user's permissions information and/or profile information. In this regard, the user may be one of several users that are affiliated with the company (e.g., project owner) responsible for managing the given construction project and authorized to perform various actions on behalf of the company via their individual SaaS accounts. The users (e.g., the users' accounts) may be associated with respective permissions that provide them with access to various tools and features that enable them to perform tasks that include creating and/or modifying financial data objects. One example of such a tool which one or more users may have permissions to access is the commitments tool described above for creating and/or modifying a "commitment" data object representing a contract or a purchase order. Different users may have different permissions levels that grant them access to different tools and/or different aspects of a given tool. The back-end computing platform's determination of which currency exchange rate option(s) are to be presented to a user that is creating or modifying a financial data object may be based on the permissions of the specific user that is creating or modifying the financial data object.

In this respect, as one possibility, the back-end computing platform's determination may involve determining a categorical permissions level associated with the user (e.g., administrator, manager, owner, standard, etc.). In such an implementation, users having a higher level of permissions (e.g., administrator-level permissions) may be presented with a broader set of currency exchange rate options for converting between the data object-specific currency and the project currency, whereas users having a lower level of permissions (e.g., standard-level permissions) may be presented with a more limited set of currency exchange rate options.

For example, if a user that is creating or modifying a financial data object has a higher level of permissions such as administrator-level permissions, the disclosed software technology may determine that the user is to be presented with a broader set of exchange rate options that may include a current exchange rate for converting between the data object-specific currency and the project currency, a custom option whereby the user may input a custom exchange rate for converting between the data object-specific currency and the project currency, and perhaps also a date lookup option and/or a date-specific option (e.g., an exchange rate associated with a prior relevant date associated with the financial date object, if applicable). On the other hand, if a user that is creating or modifying a financial data object has a lower level of permissions such as standard-level permissions, the disclosed software technology may determine that the user is to be presented with a more limited set of exchange rate options that may include as little as just a single exchange rate option—such as only the current exchange rate (if the data object is being created) or only the exchange rate associated with a prior creation date for the data object (if the data object is being modified)—or may include some other limited set of exchange rates that does not include the same universe of options that would be presented to a user having a higher level of permissions (e.g., the current exchange rate and perhaps one or more date-specific exchange rate options but not a custom option or a date lookup option). In this way, if the back-end computing platform determines that a user has a higher level of permissions, the back-end computing platform may enable the user to access and/or select certain currency exchange rate option(s) by causing those certain currency exchange rate option(s) to be presented to the user, whereas if the back-end computing platform determines that the user has a lower level of permissions, the back-end computing platform may restrict the user from accessing and/or being able to select certain currency exchange rate option(s) by causing those certain currency exchange rate option(s) to not be presented to the user.

As another possibility, the back-end computing platform's determination may involve determining whether the user's permissions meet a threshold permission level. If the user's permissions meet the threshold permission level, the back-end computing platform may determine that a broader set of currency exchange rate option(s) should be presented to the user, thereby enabling the user to access and/or select certain currency exchange rate option(s) by causing those certain currency exchange rate option(s) to be presented to the user. On the other hand, if the user's permissions do not meet the threshold permission level, the back-end computing platform may determine that a more limited set of currency exchange rate option(s) should be presented to the user, thereby restricting the user from accessing and/or being able to select certain currency exchange rate option(s) by causing those certain currency exchange rate option(s) to not be presented to the user. Other examples of determining which currency exchange rate(s) should be presented based on user information are also possible.

Advantageously, determining the currency exchange rate option(s) that are to be presented to users based on user permissions and/or profile information as described above may facilitate enforcement of increased security measures surrounding modification and/or management of currency exchange rates by enabling users to access and/or select certain currency exchange rate option(s) or restricting users from accessing and/or being able to select certain currency exchange rate option(s) based on determining their respective user permissions.

While the foregoing describes a two-tiered approach for determining the set of one or more currency exchange rate options based on user permissions, it should also be understood that a data platform could support three or more different tiers of user permissions, in which case each different tier could potentially correspond to a different set of one or more exchange rate options that is to be presented to a user or multiple different tiers of user permissions could correspond to a same set of one or more exchange rate options (e.g., a standard-level of permissions and a read-only-level of permissions could correspond to the same set of one or more exchange rate options whereas an administrator-level of permissions could correspond to a different set of one or more exchange rate options). Furthermore, it should be understood that determining the set of one or more currency exchange rate options may involve a combined evaluation of both the current status of the financial data object and the user's current permissions and/or profile information.

The back-end computing platform's determination of which currency exchange rate option(s) are to be presented to a user that is creating or modifying the financial data object may take other forms as well.

Further, in some implementations, the back-end computing platform may additionally determine an initial default exchange rate that is to be presented to the user via the financial data object interface. For example, the back-end computing platform may determine that a current exchange rate is to be presented as the default exchange rate for the financial data object, which may then be updated by the user.

At block 512, after determining which currency exchange rate option(s) should be presented to the user, the back-end computing platform may cause the user's client station to display, via the financial data object interface, the set of one or more currency exchange rate options that may be selectable by the user to specify a given exchange rate for converting between the data object-specific currency and the project currency. In this regard, the back-end computing platform may cause the user's client station to display the currency exchange rate option(s) in response to a user input, such as the user's interaction with a given GUI element (e.g., a GUI button for entering or modifying an exchange rate). The manner in which the set of one or more exchange rate options is presented to the user may take various forms. As one possibility, the set of one or more exchange rate options may be presented in a pop-up window that is overlaid on another portion of the displayed interface, whereby the user may select a given exchange rate for converting between the data object-specific currency and the project currency. As another possibility, the set of one or more exchange rate options may be presented as a drop-down menu whereby the user may select a given exchange rate for converting between the data object-specific currency and the project currency. As yet another possibility, the set of one or more exchange rate options may be presented as a radio button list whereby the user may select a given exchange rate for converting between the data object-specific currency and the project currency. Other examples are also possible.

In some implementations, as mentioned above, the back-end computing platform may cause a given exchange rate option to be pre-selected when presented to the user. As one example, where the back-end computing platform has determined that the user has a lower level of permissions, the user is creating a new financial data object, and the set of exchange rate option(s) that is to be presented to the user includes only a single option, the back-end computing platform may cause that exchange rate option to be pre-selected when presented to the user, because no other selection is possible. As another example, where the back-end computing platform has determined that the user has a higher level of permissions, the user is creating a new financial data object, and the set of exchange rate option(s) that is to be presented to the user includes a current exchange rate and a custom exchange rate, the back-end computing platform may cause a given one of the exchange rate options, such as the current exchange rate option, to be pre-selected as the default data object-specific exchange rate when the set of exchange rate option(s) is presented to the user. Other examples are also possible.

Regardless of the manner in which the set of one or more exchange rate options is presented, the back-end computing platform may also optionally prompt the user to input a confirmation that an exchange rate has been selected. For example, the user may be presented with an option to confirm a selected exchange rate for the financial data object, such as by selecting a "Save" or "Update" button. Similarly, the user may also be presented with an option to clear, reset, or cancel a selection, such as by selecting a "Cancel" or an "X" button. Other examples are also possible.

At block 514, after the user specifies a data object-specific currency exchange rate via the financial data object interface, the back-end computing platform may receive, from the user's client station, an indication that the data object-specific currency exchange rate for converting between the data object-specific currency and the project currency has been specified.

In addition to the indication of the data object-specific currency and the data object-specific currency exchange rate, the back-end computing platform may also receive, from the client station, various other information about the financial data object being created or modified that is input by the user. Such information may include, for example, general information about the project, such as the project title, project status, project description, parties associated with the project, among other examples. In this respect, such information may be received either at the same time as the indication of the selected data object-specific currency exchange rate is received (e.g., as part of the same one or more messages from the client station) or at a different time than when the indication of the selected data object-specific currency exchange rate is received.

Regardless, once the user has finished inputting the information for the financial data object being created or modified, at block 516, the back-end computing platform may proceed to create or modify the financial data object, which may involve storing data related to financial data object including the data object-specific currency and the data object-specific currency exchange rate for converting between the data object-specific currency and the project currency. More specifically, creating the financial data object may involve the back-end computing platform creating a data record that represents the financial data object that includes the information about the financial data object that was inputted by the user, including the data object-specific currency and the data object-specific currency exchange rate, whereas modifying the financial data object may involve the back-end computing platform modifying the data record that represents the financial data object to include an updated data object-specific currency and/or data object-specific currency exchange rate. In some implementations, the data object-specific currency and the data object-specific currency exchange rate may be stored as part of or as one or more separate data records that are associated with the data record that represents the financial data object. Other examples are also possible.

In some implementations, the back-end computing platform may further enable the user to enter, for each line item of a given financial data object, a line item-specific currency and a line item-specific currency exchange rate. For instance, at the time of creating or modifying a financial data object that comprises an SOV (e.g., a subcontract, a purchase order, a budget, a change order, etc.) as discussed above, the back-end computing platform may further enable the user to enter, for each line item in the SOV of the financial data object, an SOV-specific currency and an SOV-specific currency exchange rate. In this way, a user may enter, for different SOV line items of a financial data object, different currencies and/or different currency exchange rates based on when given SOV line items are performed. For example, a general contractor and a subcontractor may have agreed that SOV line items that are performed (e.g., costs incurred) before a given date should be calculated based on a first exchange rate and SOV line items that are performed after the given date should be calculated based on a second exchange rate. Therefore, when creating or modifying a "commitment" financial data object representing a commitment (e.g., subcontract, purchase order) between the general contractor and the subcontractor, a user may enter, for each SOV line item that was performed before the given date, an SOV-specific currency and a first SOV-specific currency exchange rate for converting between the SOV-specific currency and another currency (e.g., the data object-specific currency, the project currency, etc.), and for each SOV line item that was performed after the given date, the SOV-specific currency and a second SOV-specific currency exchange rate for converting between the SOV-specific currency and another currency.

The back-end computing platform may determine a set of one or more SOV-specific currency options and a set of one or more SOV-specific currency exchange rate options to be presented to the user for defining an SOV-specific currency and SOV-specific currency exchange rate in various ways, including those described above with respect to determining the data object-specific currency option(s) and the data object-specific currency exchange rate option(s). Similarly, the back-end computing platform may cause the SOV-specific currency option(s) and the SOV-specific currency exchange rate option(s) to be presented to the user for defining the SOV-specific currency and the SOV-specific currency exchange rate in various ways, including those described above with respect to causing the data object-specific currency option(s) and the data object-specific currency exchange rate option(s) to be presented to the user.

Example GUI views comprising an example financial data object interface that may be presented to a user for creating and/or modifying a financial data object having one or more financial line items will now be described in more detail with reference to FIGS. 6A-6D.

Figure 6A:
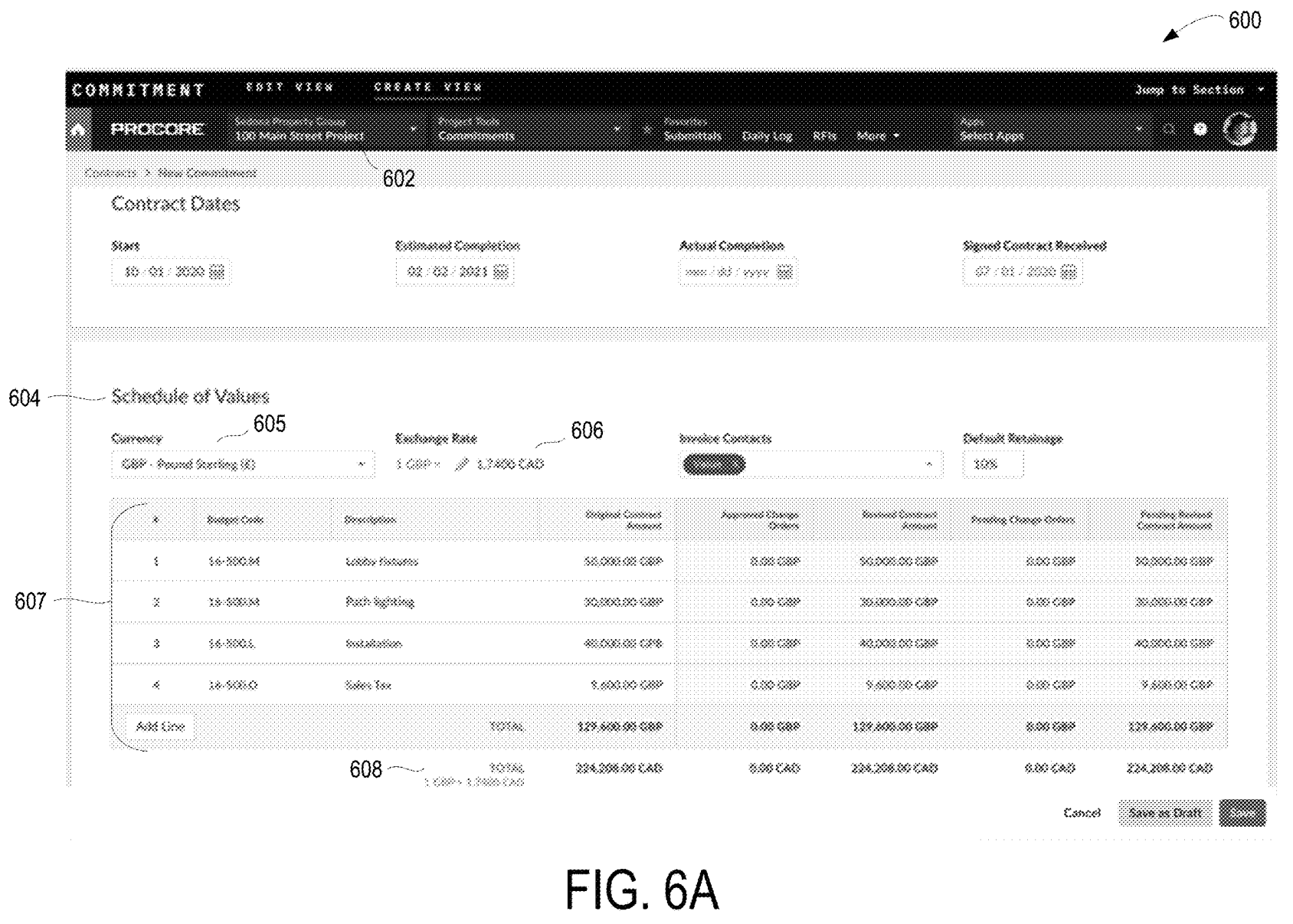

FIG. 6A depicts an example view 600 of an example interface that may be presented to a user for creating a financial data object comprising one or more financial line items. For purposes of illustration, this example assumes that the user has navigated to the view 600 after previously defining company-level and project-level currency settings as described above with reference to FIGS. 3A-3B and 4. In particular, as shown in FIG. 6A, the view 600 comprises a financial data object interface for creating a "commitment" data object that represents a given contract for a construction project 602. The financial data object interface further comprises a "Schedule of Values" (SOV) pane 604, whereby the user may add one or more SOV line items 607 that each represent an agreed-upon cost of the given contract. As shown, the interface may also enable the user to specify, for the commitment (e.g., contract) being created, a commitment-specific currency 605 and a commitment-specific exchange rate 606 that is to be used for conversion between the commitment-specific currency and the previously-defined project currency for the construction project 602.

As shown in FIG. 6A, the user has selected the currency GBP to be designated as the commitment-specific currency 605 for the given contract. The user may have selected GBP from a set of one or more selectable currency options that may have been determined by the back-end computing platform as described above and presented to the user via a drop-down menu, whereby the user may have selected GBP as the commitment-specific currency 605 from the one or more selectable currency options. Thereafter, any SOV line items 607 that are entered for the SOV 604 may be entered in the commitment-specific currency 605. In some implementations, as shown in FIG. 6A, the back-end computing platform may cause the view 600 to include a dynamic display 608 of total costs associated with the SOV line items 607 in both the commitment-specific currency 605 and the project currency based on a commitment-specific exchange rate.

After specifying the commitment-specific currency 605, the user may proceed to specify a commitment-specific exchange rate 606 for converting between the commitment-specific currency 605 (GBP) and the project currency (CAD), which may have been defined via the example GUI view 400 of FIG. 4 as discussed above. As discussed above, in some implementations, the back-end computing platform may determine a default commitment-specific exchange rate for converting between the commitment-specific currency and the project currency based at least on the current status of the financial data object being created. Here, in FIG. 6A, where the user is creating a new commitment data object, the back-end computing platform may have determined an initial value the commitment-specific exchange rate 606 that is associated with the creation date of the given contract and caused the interface to display the default commitment-specific exchange rate as a pre-selected exchange rate option. However, as discussed above, it should be understood that the back-end computing platform may determine a different default commitment-specific exchange rate or even forego specifying a default commitment-specific exchange rate and instead may leave the commitment-specific exchange rate unspecified until receiving an indication that the user has selected a desired exchange rate. The back-end computing platform may enable the user to specify a desired exchange rate for converting between the commitment-specific currency and the project currency by causing the user's client station to include in the view 600 a visual representation of an option to edit the initial exchange rate. As shown, the visual representation may take the form of a selectable icon, such as the edit icon shown in FIG. 6A. However, the visual representation may take other forms as well.

Upon receiving an indication that the user has input a selection to edit the exchange rate (e.g., by selecting the edit icon via a mouse click, touch input, or some other input), the back-end computing platform may proceed to determine a set of one or more currency exchange rate options for converting between the commitment-specific currency and the project currency. As discussed above, the back-end computing platform's determination of which currency exchange rate option(s) should be presented to the user may be based on various factors, which may include the current status of the commitment data object and/or user information such as the user's current permissions level.

Figure 6B:
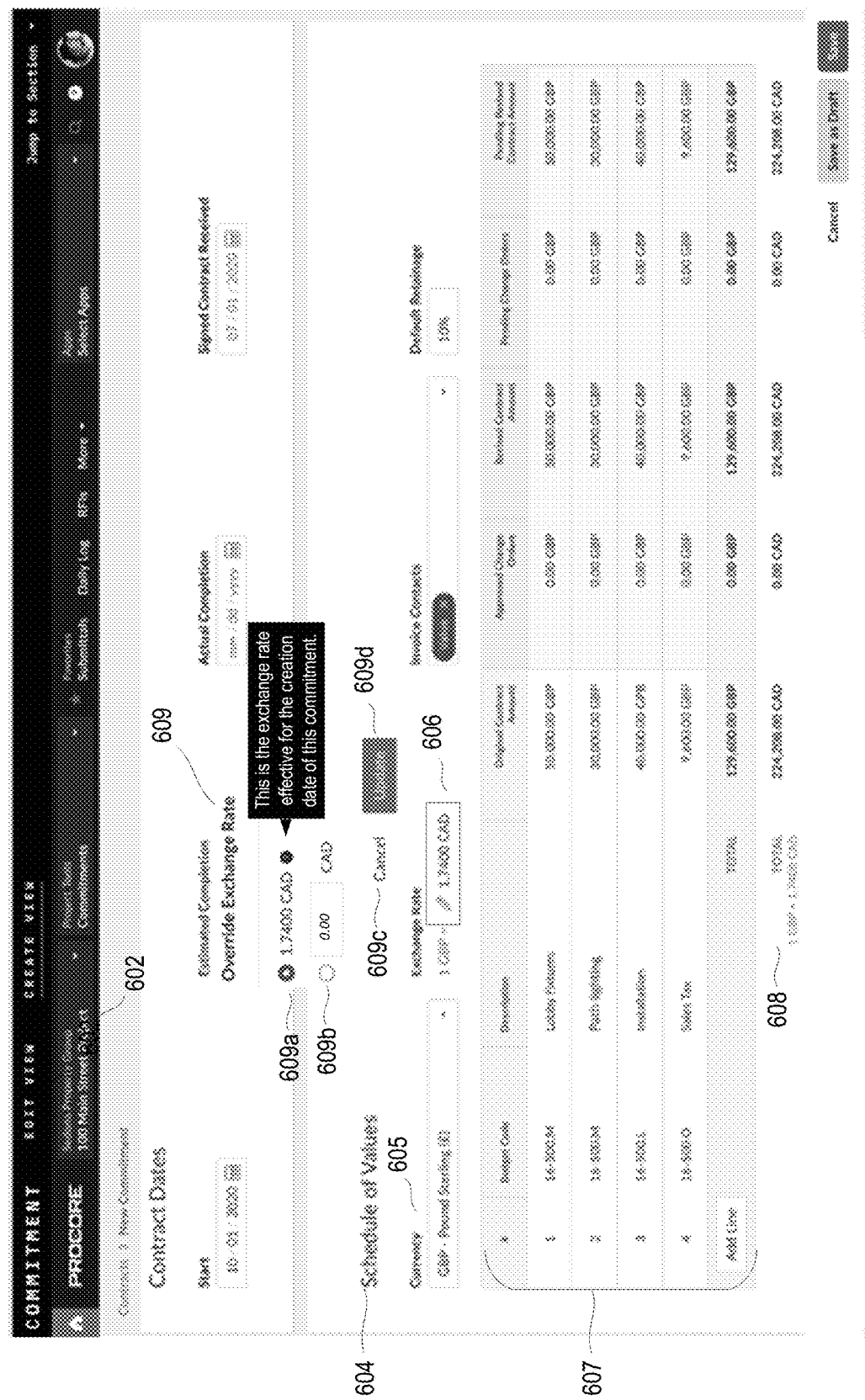

FIG. 6B depicts an updated view 620 that may be displayed to the user after the user has input a selection to edit the commitment-specific exchange rate 606. The updated view 620 may include a presentation of the set of one or more exchange rate options for converting between the commitment-specific currency 605 (GBP) and the project currency (CAD) based on the back-end computing platform's determination that the user has a higher permissions level (e.g., administrator-level permissions) and that the user is currently creating a new commitment data object (as opposed to modifying an existing commitment data object). As shown in FIG. 6B, the set of one or more exchange rate options may be presented to the user in the form of a pop-up window 609 that is overlaid on a portion of the view 620 and includes two currency exchange rate options—an exchange rate option 609a with a value of 1.7400 CAD, which represents a date-specific exchange rate option (e.g., effective exchange rate as of the date that the given contract was created), and a custom option 609b that enables the user to enter an exchange rate other than the exchange rate 609a— that are presented in the form of a radio button list. As shown, the exchange rate option 609a may have been pre-selected as the default commitment-specific exchange rate also shown in FIG. 6A. The window 609 may also include one or more selectable information icons that may provide additional information to the user about a given exchange rate option. For example, the window 609 includes a selectable question mark icon for the exchange rate option 609a that, when selected, may provide information to the user about how that exchange rate was determined. In FIG. 6B, selecting the information icon for the exchange rate option 609a may cause the view 620 to display a pop-up textbox explaining that the exchange rate option 609a represents the effective exchange rate as of the date of creation of the commitment data object (e.g., the given contract). Other examples are also possible.

The window 609 may include additional options that enable the user to indicate that a desired exchange rate has been selected or that an input provided in the window 609 has been canceled. For example, after being presented with the set of currency exchange rate options in the window 609, the user may select a given exchange rate option. In turn, the view 620 may be further updated to display a visual indication of the user's selection. While the visual indication is shown to take the form of highlighting the radio button associated with the user's selection, other examples are also possible. The user may then select the "Update" button 609d (e.g., via a mouse click input, touchpad input, touch screen input, etc.) to save the user's exchange rate selection and close the window 609. Conversely, if the user wishes to change the selection or otherwise clear an input provided in the window 609, the user may select the "Cancel" button 609c (e.g., via a mouse click input, touchpad input, touch screen input, etc.) to forego any changes to the currently-specified exchange rate and close the window 609. As shown in FIG. 6B, the exchange rate option 609a may have been pre-selected by the back-end computing platform. Therefore, the user may choose to select the cancel option 609c in order to maintain the selection of exchange rate option 609a as the commitment-specific exchange rate 606 and close the window 609, or choose a different exchange rate, such as the custom option 609b and then select the update option 609d to update the selection of exchange rate option 609b as the commitment-specific exchange rate 606 and close the window 609. In turn, the back-end computing platform may cause the user's client station to display an updated view, similar to the view 600, that displays the currently-selected commitment-specific exchange rate 606 (1.7400 CAD).

After specifying a commitment-specific currency and commitment-specific exchange rate for converting between the commitment-specific currency and the project currency, the user may proceed to complete creating the commitment data object (e.g., the given contract). Upon receiving an indication that the user has completed inputting information to create the commitment data object (e.g., the user may select an option to save information that the user has input for the commitment data object, including the commitment-specific currency and the commitment-specific currency exchange rate for the commitment SOV and one or more SOV line items), the back-end computing platform may create the commitment data object, which may involve creating a data record that represents the commitment data object, and storing the inputted information, including the information regarding the commitment-specific currency and the commitment-specific currency exchange rate for the commitment data object, as part of or as one or more data separate records that are associated with the data record that represents the financial data object.

At some point in time after creating the commitment data object that represents the contract 601, the user may also wish to edit the commitment-specific currency exchange rate 606 for the SOV of the given contract. The user may then navigate to one or more views of the financial data object interface for modifying the commitment data object representing the given contract, which may be similar to the view(s) for creating a commitment data object, whereupon the user may be presented with a view similar to the view 600 of FIG. 6A. The user may then select the edit icon for the commitment-specific currency exchange rate 606. In turn, the back-end computing platform may determine a set of one or more currency exchange rate options based on the user's current permissions level (e.g., administrator-level permissions) and the current status of the commitment data object (e.g., the commitment data object was previously-created and is currently being modified), as previously described above. The back-end computing platform may then cause the user's client station to present the determined set of one or more currency exchange rate options in an updated view.

FIG. 6C depicts one possible example of a view 630 for modifying a currency exchange rate for a previously-created commitment data object, such as a commitment data object representing the given contract that was previously created using an interface like the one illustrated in FIGS. 6A-6B. The set of one or more currency exchange rate options may be presented to the user in the form of radio button options within a pop-up window 611 that is overlaid on a portion of the view 630. The set of one or more currency exchange rate options presented in the window 611 may be different from the exchange rate option(s) that were previously determined and presented at the time of creating the commitment data object. As shown, the available exchange rate options now include three options: an exchange rate option 611a with a value of 1.7300 CAD, which may represent a date-specific exchange rate for a date relevant to the contract 601, a current exchange rate option 611b with a value of 1.7400 CAD, which represents the current effective exchange rate for converting between the commitment-specific currency and the project currency, and a custom option 611c that enables the user to enter some other exchange rate for converting between the commitment-specific currency and the project currency. As shown, the user may update the commitment-specific exchange rate 606 from the currently-selected exchange rate 611b (1.7400 CAD) to the exchange rate option 611a (1.7300 CAD) by selecting the radio button associated with the exchange rate option 611a. In turn, the view 630 may be updated to display a visual representation indicating that the exchange rate option 611a has been selected. The user may then select the "Update" option 611d to confirm the newly-specified exchange rate and close the window 611. In turn, the user may be presented with a modified view, such as the example view 640 of FIG. 6D, that displays the currently-selected commitment-specific exchange rate 606 (1.7300 CAD).

Further, in some implementations, although not shown in FIGS. 6A-6D, the back-end computing platform may additionally enable the user to specify one or both of a line item-specific currency and a line item-specific currency exchange rate for one or more of the SOV line items 607 of the SOV 604.

Furthermore, to the extent that the disclosed technology has been described above with respect to a "commitments" software tool for creating and/or modifying a "commitment" data object, it should be understood that this is for illustration purposes only and that the disclosed technology may be incorporated into any other type of software tool for creating, modifying, and/or tracking financial data objects. Such other software tools may include, as some non-limiting examples, a "bidding" software tool for creating and/or modifying a "bid" data object that represents an offer to perform work at a specified cost, a "Request for Information (RFI)" software tool for creating and/or modifying an RFI that represents a request for information or raises concerns that must be formally answered or addressed, and a "submittals" software tool for creating and/or modifying information regarding products and quantities that are to be approved for installation. The disclosed software technology may be incorporated into other types of software tools as well.

After a data object-specific currency and data object-specific exchange rate for a financial data object have been specified (e.g., defined for the first time or modified after creation), the disclosed software technology may then use the data object-specific currency and exchange rate for various purposes.

As one possibility, the disclosed software technology may use the financial data object's data object-specific currency and exchange rate (and/or a line item-specific currency and exchange rate for one or more line items of the financial data object) to convert financial information of the financial data object, such as one or more financial line items, from the data object-specific currency to a company-level and/or project-level currency when generating, tracking, and/or viewing financial reports (e.g., budgets, invoices, costs, etc.) related to the company or a given construction project. The disclosed technology may be used in other ways as well.

Figure 7:
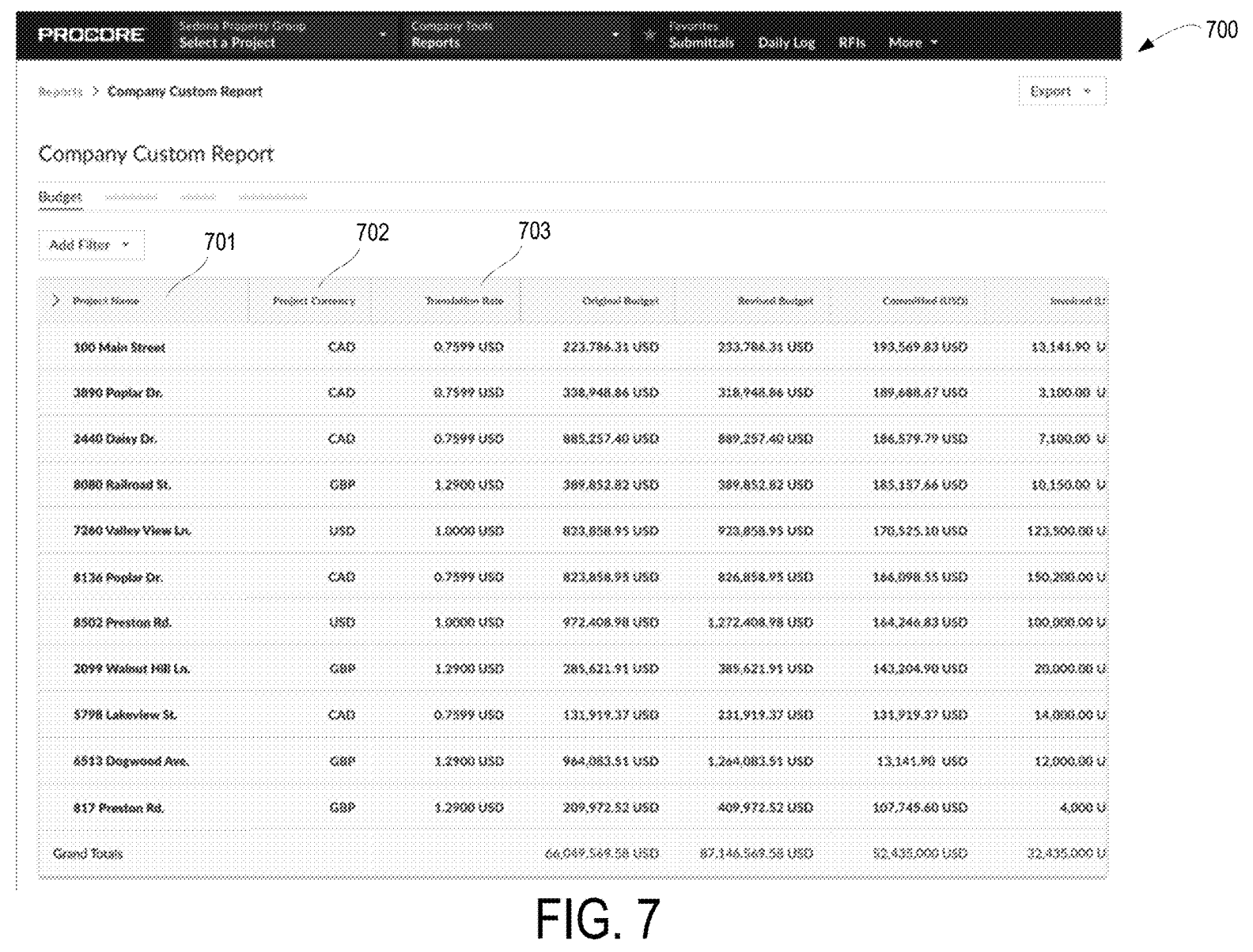

As another possibility, the disclosed software technology may use project-level currency settings to convert financial information related to one or more projects from a project currency to a company currency when generating, tracking, and/or viewing company financial reports. As one example, a company may wish to generate a financial report (e.g., budget information, committed costs information, invoice information, etc.) of ongoing construction projects involving the company. The disclosed software technology may generate the financial report using each project's respective project currency and exchange rate to convert the project's financial information from the project currency to the company currency so that the financial report may provide financial information in the company currency. FIG. 7 depicts an example company report 700 that may be generated by the disclosed software technology. As shown, the company report 700 includes a list of projects 701 involving the company, each project's respective project currency 702, and each project's respective exchange rate for converting between the project currency and the company currency 703. Notably, the company report 700 displays each project's financial information in the company currency, USD, instead of in the project's project currency.

Figure 8A:
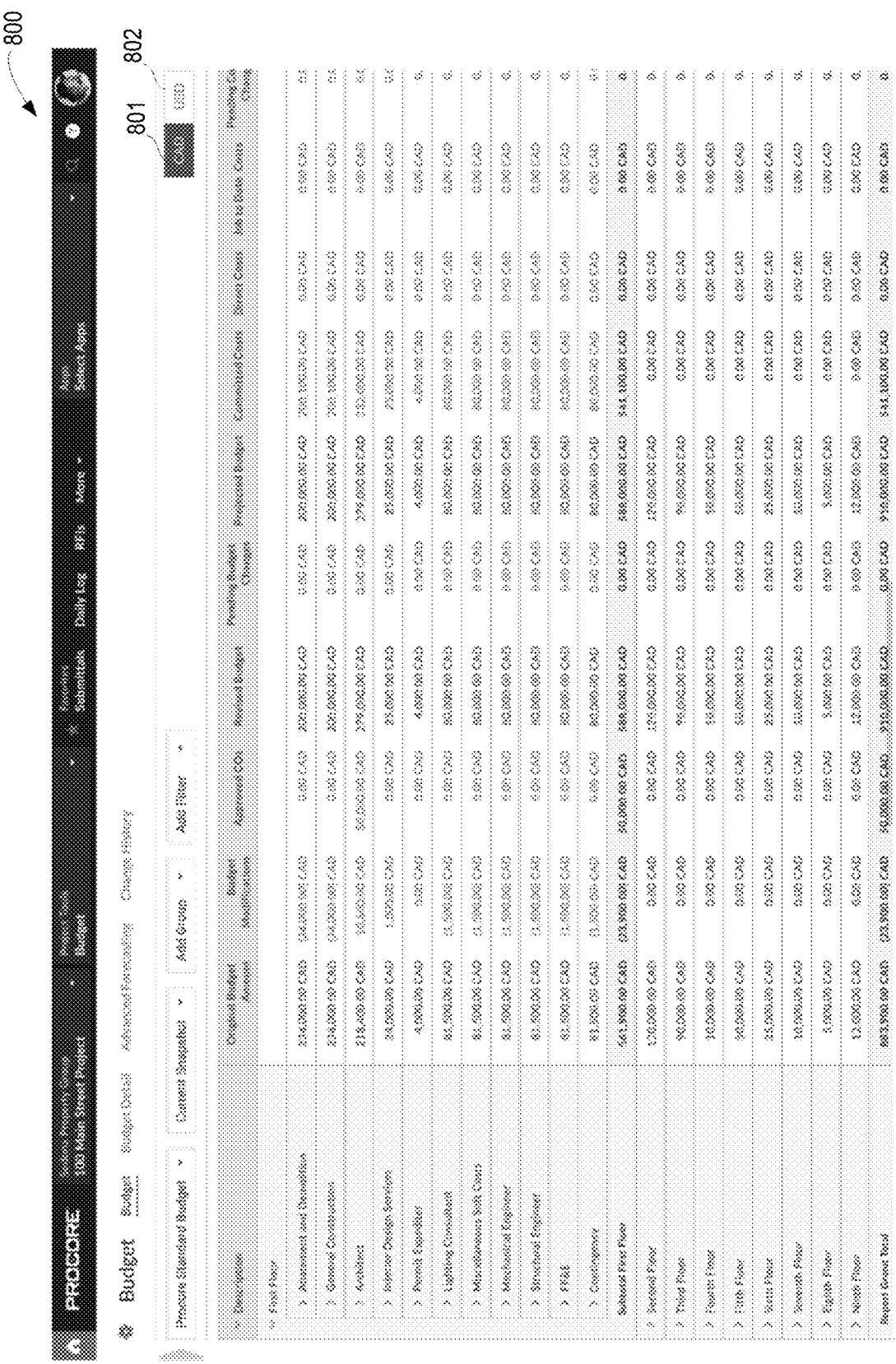
FIGS. 8A-8B depict different views of an example report according to example embodiments of the disclosed software technology.
Figure 8B:
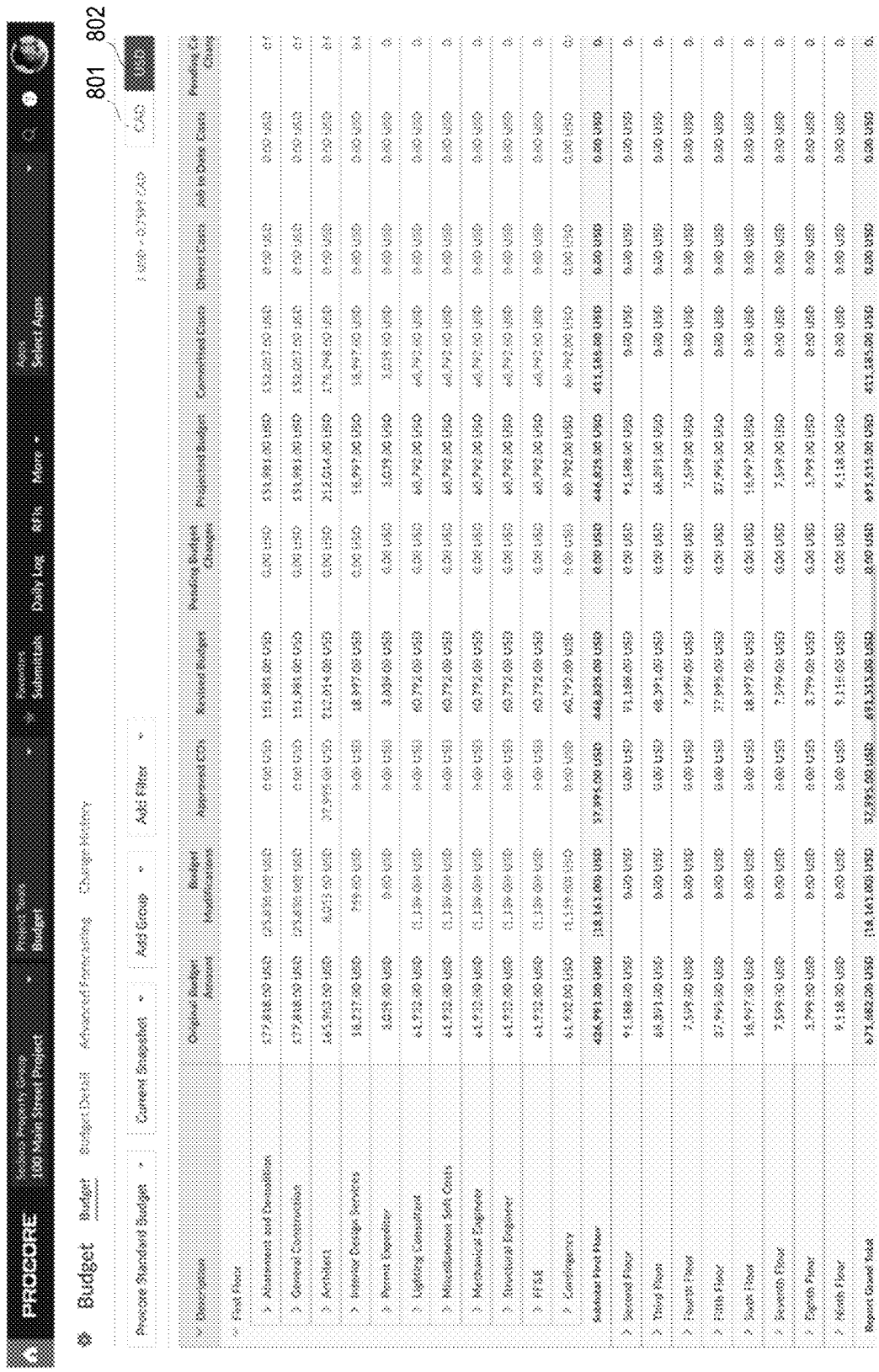

As another example, the company may wish to generate a financial report for a given construction project involving the company. The company may wish to view the report in both the project currency and the company currency. The disclosed software technology may generate the report, using the project currency and exchange rate to convert information between the project currency and the company currency. The disclosed software technology may then cause the report to be displayed in a way that enables toggling the information between the project currency and the company currency. For example, FIG. 8A depicts an example view 800 of a budget report for a given construction project that may be displayed in a given one of a project currency or a company currency. The view 800 may include a selectable visual representation 801 of the project currency, selection of which enables a user to view the report in the project currency, CAD. The view 800 may also include a second visual representation 802 of the company currency, selection of which enables the user to view the report in the company currency, USD. The view 800 may include a visual indicator of the currently-selected currency. As shown in FIG. 8A, the visual representation 801 is selected, thereby causing the budget report information to be displayed in the project currency, CAD. Selecting the visual representation 802 may cause the view to be updated to the view 820 in FIG. 8B, which causes the budget report information to be displayed in the company currency, USD.

In this way, the disclosed software technology enables convenient monitoring and tracking of financial information in a desired currency.

The disclosed software technology may use a financial data object's selected currency and exchange rate in other manners as well. As one possibility, a financial data object's selected currency and exchange rate may be considered during an approval process for the financial data object. For instance, certain financial data objects, such as Potential Change Orders ("PCO") data objects that are created to track changes in work conditions that impact project costs, involve a chain of approval wherein the financial data objects are reviewed in order to determine if they warrant a formal memorialization (e.g., an approved PCO is memorialized as a Commitment Change Order that reflects relevant modifications to the related commitment). Thus, the data associated with such financial data objects, including the selected currency and exchange rate, may be considered during the approval process. As another possibility, the selected currency and exchange rate may be used to inform and/or synchronize data that is exchanged between the construction management software application in which the disclosed technology is incorporated and any integrated Enterprise Resource Planning (ERP) software applications. Still other examples are possible.

Furthermore, the technological improvements offered by the disclosed software technology as described above may provide parties collaborating on a construction project with increased flexibility and autonomy over various aspects of financial management related to the construction project. As one example, the disclosed software technology enables more flexible negotiation for costs related to the project. For instance, currency exchange rates can be re-negotiated throughout the duration of the project as needed and easily implemented across financial data objects. As another example, the disclosed software technology enables parties to manage financial information of the construction project in their respectively preferred (or required) currencies. As yet another example, the disclosed software technology facilitates seamless translation of reporting data between multiple currencies, which may further facilitate collaboration between parties located in different geographical locations and operating with different currencies. As still another example, the disclosed software technology enables security around currency rate adjustments by enforcing permissions-based access.

While the disclosed software technology has been described above as being carried out by a combination of computing devices, such as a back-end computing platform and at least one client station, it is possible that the functions described herein could be carried out by a single computing device, such as computing device 200 of FIG. 2. In this respect, it should be understood that, depending on the implementation, the operations discussed herein below may be carried out entirely by a single computing device, such as one or more of client stations 112 or by back-end platform 102. Further, other arrangements of one or more computing devices each carrying out one or more of the functions described herein are possible as well.

Furthermore, while the disclosed software technology has been described in the examples above in the context of creating and/or modifying a financial data object related to a construction project, it should be understood that the disclosed software technology may be incorporated with any financial management software tool that involves creating, modifying, and/or tracking financial data objects.

IV. CONCLUSION

Example embodiments of the disclosed innovations have been described above. Those skilled in the art will understand, however, that changes and modifications may be made to the embodiments described without departing from the true scope and spirit of the present invention, which will be defined by the claims.

For instance, those in the art will understand that the disclosed optimization techniques for calculating a shortest distance between two objects may be implemented in other areas. The disclosed software technology for calculating a shortest distance may be used in other ways as well.

Further, to the extent that examples described herein involve operations performed or initiated by actors, such as "humans," "operators," "users" or other entities, this is for purposes of example and explanation only. The claims should not be construed as requiring action by such actors unless explicitly recited in the claim language.

The invention claimed is:

1. A computing device comprising:
a network interface;
at least one processor;
a non-transitory computer-readable medium; and
program instructions stored on the non-transitory computer-readable medium that are executable by the at least one processor such that the computing device is configured to:
receive, via a graphical user interface (GUI) presenting a GUI view, a first request on behalf of a given user to select a data-object currency for a given data object associated with a given construction project;
based at least on (i) project-level currency settings for the given construction project and (ii) permissions information for the given user, identify a set of one or more currency options from which the given user is permitted to select a data-object currency for the given data object;
based on identifying the set of one or more currency options, pre-populate a first listing of options with a respective selectable representation of each currency option in the set of one or more currency options;

dynamically update the GUI view to present the first listing of options that is pre-populated with the respective selectable representations of the one or more currency options from which the given user is permitted to select a data-object currency for the given data object;

receive, via the GUI, an indication of a given currency option that has been selected by the given user from the first listing of options as the data-object currency for the given data object, wherein the selected data-object currency differs from a designated project currency for the given construction project;

receive, via the GUI, a second request on behalf of the given user to select an exchange rate that is to be used for converting between the data-object currency and the project currency;

based at least on (i) information about the given data object and (ii) the permissions information for the given user, identify a set of one or more exchange rate options from which the given user is permitted to select an exchange rate that is to be used for converting between the data-object currency and the project currency;

based on identifying the set of one or more exchange rate options, pre-populate a second listing of options with a respective selectable representation of each exchange rate option in the set of one or more exchange rate options;

dynamically update the GUI view to present the second listing of options that is pre-populated with the respective selectable representations of the one or more exchange rate options from which the given user is permitted to select an exchange rate that is to be used for converting between the data-object currency and the project currency;

receive, via the GUI, an indication of a given exchange rate option that has been selected by the given user from the second listing of options as the exchange rate that is to be used for converting between the data-object currency for the given data object and the project currency; and dynamically update the GUI view to present a visual representation of the given data object indicating (i) the data-object currency that has been selected for the given data object and (ii) the exchange rate that has been selected for converting between the data-object currency for the given data object and the project currency.

2. The computing device of claim 1, further comprising program instructions stored on the non-transitory computer-readable medium that are executable by the at least one processor such that the computing device is configured to:

before receiving the first request:
receive data defining project-level currency settings for the given construction project that indicate (i) the designated project currency for the given construction project, (ii) a set of one or more alternative currency options, and (iii) for each alternative currency option, a respective set of one or more exchange rate options for converting between the designated project currency and the alternative currency.

3. The computing device of claim 2, wherein:
the program instructions that are executable by the at least one processor such that the computing device is configured to identify the set of one or more currency options from which the given user is permitted to select the data-object currency comprise program instructions that are executable by the at least one processor such that the computing device is configured to:
determine that the given user is (a) authorized to access a given subset of the set of one or more alternative currency options and (b) restricted from accessing any other alternative currency option in the set;

each currency option in the set of one or more currency options from which the given user is permitted to select the data-object currency for the given data object corresponds to an alternative currency option in the given subset of alternative currency options; and the selected data-object currency comprises a given alternative currency option.

4. The computing device of claim 3, wherein:
the program instructions that are executable by the at least one processor such that the computing device is configured to identify the set of one or more exchange rate options from which the given user is permitted to select the exchange rate comprise program instructions that are executable by the at least one processor such that the computing device is configured to:
determine that the given user is (a) authorized to access only a given subset of the respective set of one or more exchange rate options corresponding to the given alternative currency option and (b) restricted from accessing any other exchange rate options in the respective set; and each exchange rate option in the set of one or more exchange rate options from which the given user is permitted to select the exchange rate corresponds to an exchange rate option in the given subset of exchange rate options.

5. The computing device of claim 1, wherein the first request to select the data-object currency for the given data object comprises a request to create the given data object, the computing device further comprising program instructions stored on the non-transitory computer-readable medium that are executable by the at least one processor such that the computing device is configured to:
receive an indication confirming the data-object currency and the exchange rate that have been selected for the given data object; and after receiving the indication confirming the data-object currency and the exchange rate, cause storage of data defining the given data object that indicates (i) the data-object currency that has been selected for the given data object and (ii) the exchange rate that has been selected for converting between the data-object currency for the given data object and the project currency.

6. The computing device of claim 1, further comprising program instructions stored on the non-transitory computer-readable medium that are executable by the at least one processor such that the computing device is configured to:
after receiving the indication of the given currency option that has been selected from the first listing as the data-object currency for the given data object, display an indication of the selected data-object currency; and after receiving the indication of the given exchange rate option that has been selected from the second listing as the exchange rate that is to be used for converting between the data-object currency for the given data object and the project currency, display an indication of the selected exchange rate.

7. The computing device of claim 1, wherein the permissions information for the given user indicates a first permission level, and wherein the set of one or more exchange rate options from which the given user is permitted to select an exchange rate includes at least: (i) a default exchange rate option and (ii) a custom exchange rate option.

8. The computing device of claim 7, wherein the first permission level comprises an administrator-level permission level.

9. The computing device of claim 1, wherein the permissions information for the given user indicates a second permission level, and wherein the set of one or more exchange rate options from which the given user is permitted to select an exchange rate includes only a default exchange rate option.

10. The computing device of claim 1, further comprising program instructions stored on the non-transitory computer-readable medium that are executable by the at least one processor such that the computing device is configured to:
receive user input defining a financial line item for the given data object that includes a respective cost-type value corresponding to at least one cost type for the financial line item, wherein each respective cost-type value is reflected in the data-object currency for the given data object;
for each cost type for the financial line item, convert the respective cost-type value from the data-object currency to the project currency based on the exchange rate for the given data object;
present an updated visual representation of the given data object that includes (i) information about the financial line item, (ii) each cost type and its respective cost-type value in the data-object currency, and (iii) a total cost-type value for all cost types for the financial line item in the project currency as converted from the data-object currency based on the exchange rate for the given data object; and
dynamically update the total cost-type value based on a modification to any respective cost-type value.

11. The computing device of claim 1, wherein the given user is a first user and the set of one or more exchange rate options is a first set of one or more exchange rate options, the computing device further comprising program instructions stored on the non-transitory computer-readable medium that are executable by the at least one processor such that the computing device is configured to:
receive a request on behalf of a second user to select a new exchange rate that is to be used for converting between the data-object currency and the project currency;
based at least on (i) the information about the given data object and (ii) permissions information for the second user, identify a second set of one or more exchange rate options from which the second user is permitted to select the new exchange rate, wherein the second set of one or more exchange rate options differs from the first set of one or more exchange rate options;
pre-populate a third listing of options with a respective selectable representation of each exchange rate option in the second set of one or more exchange rate options;
present the third listing of options that is pre-populated with the respective selectable representations of the one or more exchange rate options from which the second user is permitted to select a new exchange rate that is to be used for converting between the data-object currency and the project currency;
receive an indication of a given exchange rate option that has been selected by the second user from the third listing of options to be used as the new exchange rate for converting between the data-object currency and the project currency;
present an updated visual representation of the given data object indicating (i) the data-object currency for the given data object and (ii) the new exchange rate for converting between the data-object currency for the given data object and the project currency; and
cause data defining the given data object to be updated to indicate the new exchange rate.

12. The computing device of claim 11, wherein the permissions information for the second user indicates a first permission level, and wherein the second set of one or more exchange rate options includes (i) a date-specific exchange rate option, (ii) a default exchange rate option, and (iii) a custom exchange rate option.

13. A non-transitory computer-readable medium, wherein the non-transitory computer-readable medium is provisioned with program instructions that, when executed by at least one processor, cause a computing device to:
receive, via a graphical user interface (GUI) presenting a GUI view, a first request on behalf of a given user to select a data-object currency for a given data object associated with a given construction project;
based at least on (i) project-level currency settings for the given construction project and (ii) permissions information for the given user, identify a set of one or more currency options from which the given user is permitted to select a data-object currency for the given data object;
based on identifying the set of one or more currency options, pre-populate a first listing of options with a respective selectable representation of each currency option in the set of one or more currency options;
dynamically update the GUI view to present the first listing of options that is pre-populated with the respective selectable representations of the one or more currency options from which the given user is permitted to select a data-object currency for the given data object;
receive, via the GUI, an indication of a given currency option that has been selected by the given user from the first listing of options as the data-object currency for the given data object, wherein the selected data-object currency differs from a designated project currency for the given construction project;
receive, via the GUI, a second request on behalf of the given user to select an exchange rate that is to be used for converting between the data-object currency and the project currency;
based at least on (i) information about the given data object and (ii) the permissions information for the given user, identify a set of one or more exchange rate options from which the given user is permitted to select an exchange rate that is to be used for converting between the data-object currency and the project currency;
based on identifying the set of one or more exchange rate options, pre-populate a second listing of options with a respective selectable representation of each exchange rate option in the set of one or more exchange rate options;
dynamically update the GUI view to present the second listing of options that is pre-populated with the respective selectable representations of the one or more exchange rate options from which the given user is permitted to select an exchange rate that is to be used for converting between the data-object currency and the project currency;
receive, via the GUI, an indication of a given exchange rate option that has been selected by the given user from the second listing of options as the exchange rate that is to be used for converting between the data-object currency for the given data object and the project currency; and
dynamically update the GUI view to present a visual representation of the given data object indicating (i) the data-object currency that has been selected for the given data object and (ii) the exchange rate that has been selected for converting between the data-object currency for the given data object and the project currency.

14. The non-transitory computer-readable medium of claim 13, wherein the non-transitory computer-readable medium is also provisioned with program instructions that, when executed by at least one processor, cause the computing device to:
before receiving the first request:
receive data defining project-level currency settings for the given construction project that indicate (i) the designated project currency for the given construction project, (ii) a set of one or more alternative currency options, and (iii) for each alternative currency option, a respective set of one or more exchange rate options for converting between the designated project currency and the alternative currency.

15. The non-transitory computer-readable medium of claim 14, wherein:
the program instructions that, when executed by at least one processor, cause the computing device to identify the set of one or more currency options from which the given user is permitted to select the data-object currency comprise program instructions that, when executed by at least one processor, cause the computing device to:
determine that the given user is (a) authorized to access a given subset of the set of one or more alternative currency options and (b) restricted from accessing any other alternative currency option in the set;
each currency option in the set of one or more currency options from which the given user is permitted to select the data-object currency for the given data object corresponds to an alternative currency option in the given subset of alternative currency options; and
the selected data-object currency comprises a given alternative currency option.

16. The non-transitory computer-readable medium of claim 15, wherein:
the program instructions that, when executed by at least one processor, cause the computing device to identify the set of one or more exchange rate options from which the given user is permitted to select the exchange rate comprise program instructions that, when executed by at least one processor, cause the computing device to:
determine that the given user is (a) authorized to access only a given subset of the respective set of one or more exchange rate options corresponding to the given alternative currency option and (b) restricted from accessing any other exchange rate options in the respective set; and each exchange rate option in the set of one or more exchange rate options from which the given user is permitted to select the exchange rate corresponds to an exchange rate option in the given subset of exchange rate options.

17. The non-transitory computer-readable medium of claim 13, wherein the non-transitory computer-readable medium is also provisioned with program instructions that, when executed by at least one processor, cause the computing device to:
receive user input defining a financial line item for the given data object that includes a respective cost-type value corresponding to at least one cost type for the financial line item, wherein each respective cost-type value is reflected in the data-object currency for the given data object;
for each cost type for the financial line item, convert the respective cost-type value from the data-object currency to the project currency based on the exchange rate for the given data object;
present an updated visual representation of the given data object that includes (i) information about the financial line item, (ii) each cost type and its respective cost-type value in the data-object currency, and (iii) a total cost-type value for all cost types for the financial line item in the project currency as converted from the data-object currency based on the exchange rate for the given data object; and
dynamically update the total cost-type value based on a modification to any respective cost-type value.

18. A method carried out by a computing device, the method comprising:
receiving, via a graphical user interface (GUI) presenting a GUI view, a first request on behalf of a given user to select a data-object currency for a given data object associated with a given construction project;
based at least on (i) project-level currency settings for the given construction project and (ii) permissions information for the given user, identifying a set of one or more currency options from which the given user is permitted to select a data-object currency for the given data object;
based on identifying the set of one or more currency options, pre-populating a first listing of options with a respective selectable representation of each currency option in the set of one or more currency options;
dynamically updating the GUI view to present the first listing of options that is pre-populated with the respective selectable representations of the one or more currency options from which the given user is permitted to select a data-object currency for the given data object;
receiving, via the GUI, an indication of a given currency option that has been selected by the given user from the first listing of options as the data-object currency for the given data object,
wherein the selected data-object currency differs from a designated project currency for the given construction project;
receiving, via the GUI, a second request on behalf of the given user to select an exchange rate that is to be used for converting between the data-object currency and the project currency;
based at least on (i) information about the given data object and (ii) the permissions information for the given user, identifying a set of one or more exchange rate options from which the given user is permitted to select an exchange rate that is to be used for converting between the data-object currency and the project currency;

based on identifying the set of one or more exchange rate options, pre-populating a second listing of options with a respective selectable representation of each exchange rate option in the set of one or more exchange rate options;

dynamically updating the GUI view to present the second listing of options that is pre-populated with the respective selectable representations of the one or more exchange rate options from which the given user is permitted to select an exchange rate that is to be used for converting between the data-object currency and the project currency;

receiving, via the GUI, an indication of a given exchange rate option that has been selected by the given user from the second listing of options as the exchange rate that is to be used for converting between the data-object currency for the given data object and the project currency; and dynamically updating the GUI view to present a visual representation of the given data object indicating (i) the data-object currency that has been selected for the given data object and (ii) the exchange rate that has been selected for converting between the data-object currency for the given data object and the project currency.

19. The method of claim 18, further comprising:
before receiving the first request:
receiving data defining project-level currency settings for the given construction project that indicate (i) the designated project currency for the given construction project, (ii) a set of one or more alternative currency options, and (iii) for each alternative currency option, a respective set of one or more exchange rate options for converting between the designated project currency and the alternative currency.

20. The method of claim 18, further comprising:
receiving user input defining a financial line item for the given data object that includes a respective cost-type value corresponding to at least one cost type for the financial line item, wherein each respective cost-type value is reflected in the data-object currency for the given data object;

for each cost type for the financial line item, converting the respective cost-type value from the data-object currency to the project currency based on the exchange rate for the given data object;

presenting an updated visual representation of the given data object that includes (i) information about the financial line item, (ii) each cost type and its respective cost-type value in the data-object currency, and (iii) a total cost-type value for all cost types for the financial line item in the project currency as converted from the data-object currency based on the exchange rate for the given data object; and dynamically updating the total cost-type value based on a modification to any respective cost-type value.

* * * * *